United States Patent
Kallman et al.

(10) Patent No.: US 10,838,461 B2
(45) Date of Patent: Nov. 17, 2020

(54) INPUT MECHANISM WITH DEFORMABLE TOUCH-SENSITIVE MATERIAL

(71) Applicant: Apple Inc., Cupertino, CA (US)

(72) Inventors: Benjamin J. Kallman, Cupertino, CA (US); Eric S. Jol, San Jose, CA (US); Timothy J. Rasmussen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/380,812

(22) Filed: Apr. 10, 2019

(65) Prior Publication Data

US 2019/0235569 A1     Aug. 1, 2019

Related U.S. Application Data

(63) Continuation of application No. 14/817,328, filed on Aug. 4, 2015, now Pat. No. 10,296,047.

(51) Int. Cl.
| | |
|---|---|
| *G06F 1/16* | (2006.01) |
| *G04G 21/08* | (2010.01) |
| *G06F 3/01* | (2006.01) |
| *G04G 17/06* | (2006.01) |
| *A45C 11/00* | (2006.01) |

(52) U.S. Cl.
CPC .............. *G06F 1/163* (2013.01); *G04G 17/06* (2013.01); *G04G 21/08* (2013.01); *G06F 1/1635* (2013.01); *G06F 1/1656* (2013.01); *G06F 1/1684* (2013.01); *G06F 3/011* (2013.01); *A45C 2011/002* (2013.01); *G06F 2200/1633* (2013.01)

(58) Field of Classification Search
CPC ........ G06F 3/044; G06F 3/0414; G06F 1/169; G06F 3/0416; G06F 3/0488; G06F 3/03547; G06F 3/041; G06F 3/045; G06F 2203/04105

USPC ............ 361/679.4; 345/173, 174; 73/862.68, 73/753, 780
See application file for complete search history.

(56) References Cited

U.S. PATENT DOCUMENTS

| | | |
|---|---|---|
| 4,037,068 A | 7/1977 | Gaynor |
| 4,258,096 A | 3/1981 | LaMarche |

(Continued)

FOREIGN PATENT DOCUMENTS

| | | |
|---|---|---|
| EP | 2720129 | 4/2014 |
| KR | 20080045397 | 5/2008 |

OTHER PUBLICATIONS

Crowder, "Tactile Sensors," Jan. 1998, retrieved from http://www.southamptom.ac.uk/~rmcl/robotics/artactile.htm, 9 pages.

*Primary Examiner* — Mandeep S Buttar
(74) *Attorney, Agent, or Firm* — Morgan, Lewis & Bokius LLP

(57) ABSTRACT

A case for an electronic device is disclosed. The case includes a body defining an interior volume configured to receive the electronic device therein. The body includes a user input region formed from a deformable material having an electrical resistance that decreases in response to a touch force on the deformable material, and an electrode pair in contact with the deformable material and configured to be operatively coupled to a sensing circuit configured to detect a change to the electrical resistance of the deformable material due to the touch force. The body also includes a connector configured to operatively couple the electrode pair to the electronic device.

20 Claims, 16 Drawing Sheets

(56) References Cited

U.S. PATENT DOCUMENTS

| | | |
|---|---|---|
| 4,324,956 A | 4/1982 | Sakakino et al. |
| 4,345,119 A | 8/1982 | Latasiewicz |
| 4,581,509 A | 4/1986 | Sanford et al. |
| 4,644,101 A | 2/1987 | Jin |
| 4,922,070 A | 5/1990 | Dorkinski |
| 5,060,527 A | 10/1991 | Burgess |
| 5,258,592 A | 11/1993 | Nishikawa et al. |
| 6,963,039 B1 | 11/2005 | Weng et al. |
| 7,612,997 B1 | 11/2009 | Diebel |
| 8,167,126 B2 | 5/2012 | Stiehl |
| 8,248,815 B2 | 8/2012 | Yang et al. |
| 8,253,696 B2 | 8/2012 | Antaki |
| 8,263,886 B2 | 9/2012 | Lin et al. |
| 8,432,368 B2 | 4/2013 | Momeyer et al. |
| 8,446,713 B2 | 5/2013 | Lai |
| 8,576,044 B2 | 11/2013 | Chapman |
| 8,885,856 B2 | 11/2014 | Sacha |
| 2004/0082414 A1 | 4/2004 | Knox |
| 2005/0103124 A1 | 5/2005 | Asai |
| 2006/0197750 A1* | 9/2006 | Kerr ........................ G06F 1/1626 345/173 |
| 2006/0244732 A1 | 11/2006 | Geaghan |
| 2009/0169977 A1* | 7/2009 | Sfarzo ................. H01M 6/5044 429/50 |
| 2009/0312051 A1 | 12/2009 | Hansson et al. |
| 2010/0231422 A1* | 9/2010 | Inaba ....................... G06F 3/045 341/20 |
| 2011/0248916 A1 | 10/2011 | Griffin |
| 2011/0312349 A1 | 12/2011 | Forutanpour |
| 2012/0067711 A1 | 3/2012 | Yang et al. |
| 2012/0106037 A1 | 5/2012 | Diebel |
| 2013/0037396 A1 | 2/2013 | Ku |
| 2013/0087443 A1 | 4/2013 | Kikuchi |
| 2013/0285970 A1 | 10/2013 | Ahn |
| 2015/0116289 A1 | 4/2015 | Stern |
| 2015/0221460 A1 | 8/2015 | Teplitxky et al. |
| 2015/0228423 A1 | 8/2015 | Sanford et al. |
| 2017/0242506 A1* | 8/2017 | Patel ........................ G06F 3/041 |
| 2017/0262066 A1* | 9/2017 | Kawamura ........... A44C 5/0053 |
| 2017/0285849 A1 | 10/2017 | Kim |
| 2018/0074637 A1* | 3/2018 | Rosenberg ............. G06F 3/0418 |
| 2018/0314333 A1* | 11/2018 | Levesque ................ G06F 3/041 |

\* cited by examiner

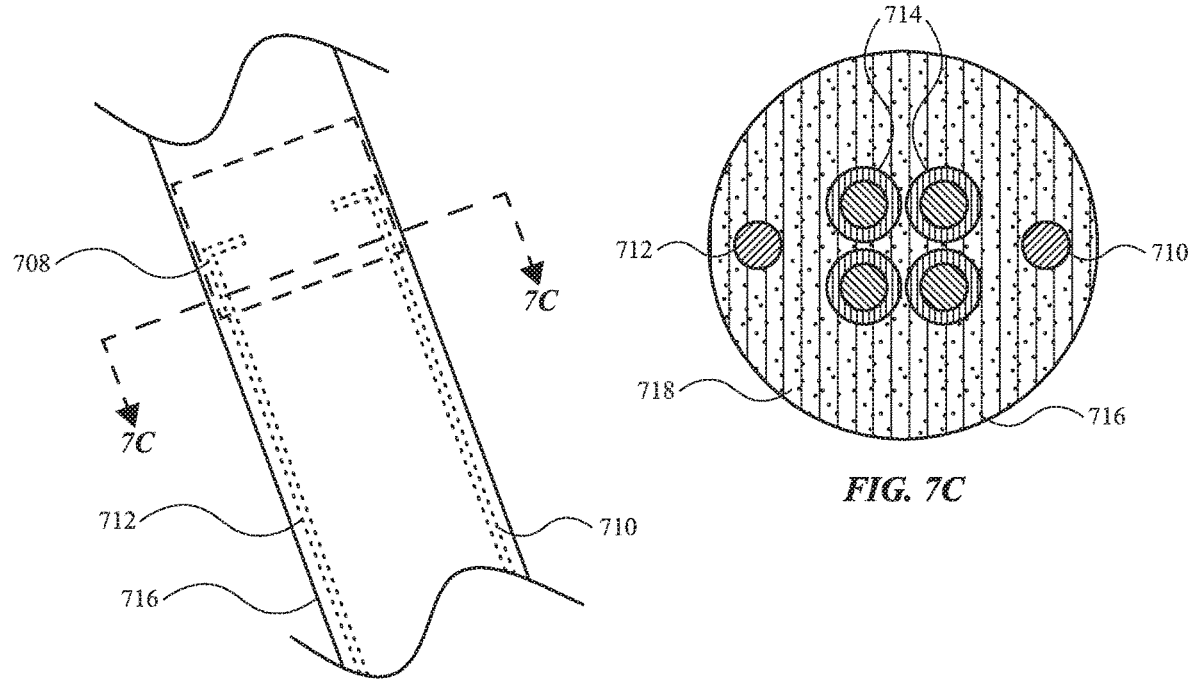
FIG. 7B
FIG. 7C
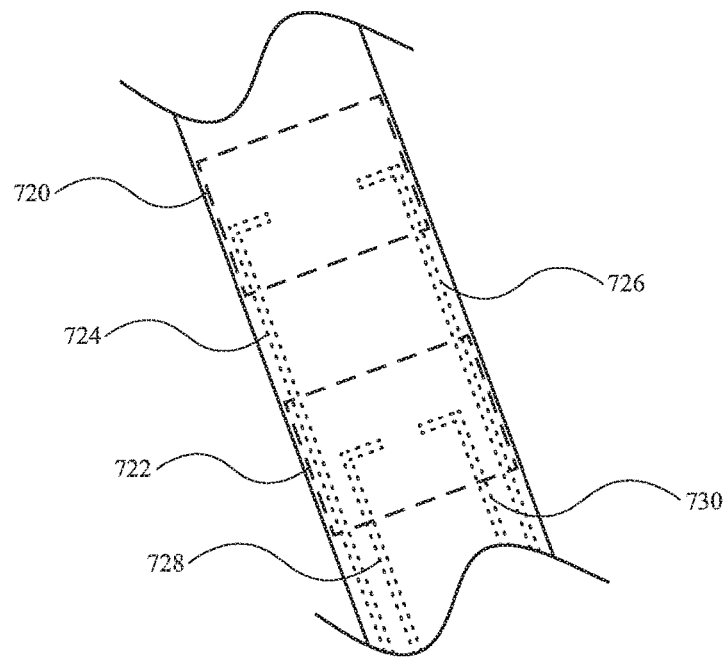
FIG. 7D

INPUT MECHANISM WITH DEFORMABLE TOUCH-SENSITIVE MATERIAL

CROSS-REFERENCE TO RELATED APPLICATIONS

This application is a continuation patent application of U.S. patent application Ser. No. 14/817,328, filed Aug. 4, 2015, the disclosure of which is hereby incorporated by reference herein in its entirety.

FIELD

The described embodiments relate generally to input mechanisms for electronic devices. More particularly, the present embodiments relate to input mechanisms that include touch-sensitive materials such as quantum tunneling materials.

BACKGROUND

Many types of electronic devices utilize input devices to receive user inputs from users. For example, smartphones, laptop computers, and wearable electronic devices (e.g., smartwatches) may include buttons, switches, touchpads, dials, and the like. Mechanical input devices may include mechanical components and electrical components. For example, a conventional push-button may include a moveable button portion, biasing springs, and mechanical interlocks to retain the button portion to the electronic device, as well as circuit elements (e.g., electrical contacts) that provide an electrical contact closure when the button is pressed. Input devices provide mechanisms by which a user can interact with and control the operation of an electronic device.

SUMMARY

A case for an electronic device comprises a body defining an interior volume configured to receive the electronic device therein. The body comprises a user input region formed from a deformable material having an electrical resistance that decreases in response to a touch force on the deformable material. The body further comprises an electrode pair in contact with the deformable material and configured to be operatively coupled to a sensing circuit configured to detect a change to the electrical resistance of the deformable material due to the touch force. The body further comprises a connector configured to operatively couple the electrode pair to the electronic device.

An electronic device comprises a display device forming a front surface of the electronic device, a sensing circuit, and a housing forming a back surface of the electronic device opposite to the front surface. The back surface comprises a user input region formed from a quantum tunneling material, where the sensing circuit is configured to detect a change in an electrical property of the quantum tunneling material in response to a deformation resulting from a touch force of a user input.

A wearable electronic device comprises a housing, a processing unit within the housing, and a band coupled to the housing and configured to couple the wearable electronic device to a user. The band comprises an input region formed from a touch-sensitive material. The touch-sensitive material is operatively coupled to the processing unit, and the processing unit detects a deformation of the input region based on a change in an electrical characteristic of the touch-sensitive material.

An input device for an electronic device comprises a first layer comprising a first touch-sensitive material, and a second layer comprising a second touch-sensitive material disposed below the first layer. An electrical resistance of the first and second layers changes differently in response to application of a force to the first layer.

BRIEF DESCRIPTION OF THE DRAWINGS

The disclosure will be readily understood by the following detailed description in conjunction with the accompanying drawings, wherein like reference numerals designate like structural elements, and in which:

FIG. 7B shows a portion of an example headset cable that includes touch-sensitive materials;

FIG. 7C shows a cross-sectional view of an example headset cable;

FIG. 7D shows a portion of an example headset cable that includes touch-sensitive materials.

DETAILED DESCRIPTION

Figure 1A:
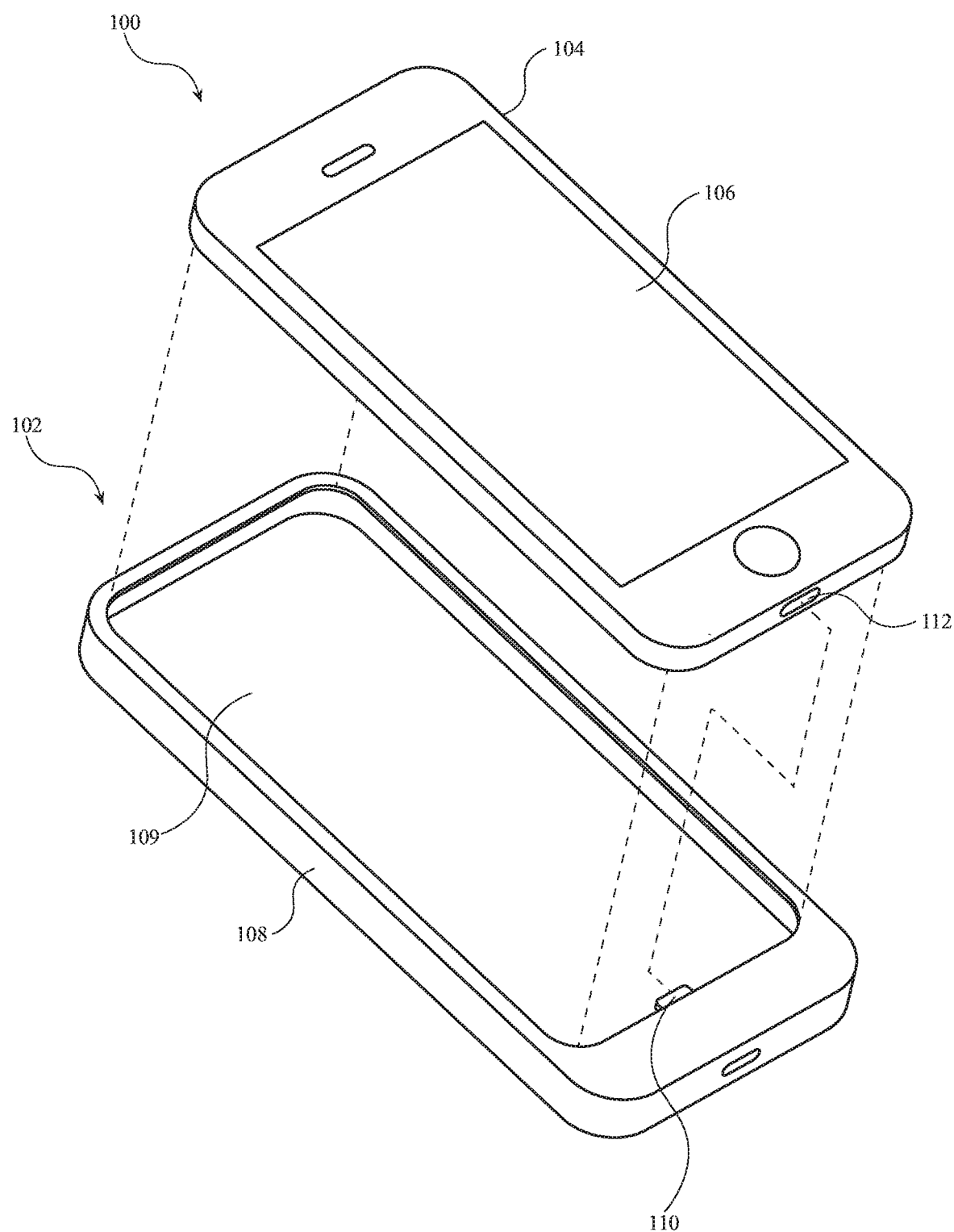
FIGS. 1A-1B show isometric views of an example electronic device and a case for the electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure relates to touch-sensitive materials, and systems and apparatuses that have input mechanisms that are formed from or otherwise use touch-sensitive materials. For example, a smartphone or a case for a smartphone may include (or be formed entirely from) an elastomeric material having an electrical resistance (or other detectible electrical characteristic) that changes in response to being deformed. Accordingly, deformation of the elastomeric material due to a user pressing the material may result in a detectable change to the electrical resistance. The smartphone may thus sense and/or monitor the electrical resistance of the elastomeric material, or a particular portion thereof, such that the material provides input functionality for the smartphone.

Some conventional input mechanisms include multi-part mechanical structures, which may include springs, dome switches, scissor mechanisms, levers, actuation members, moveable electrical contacts, and the like. Because of the electrical and mechanical structures, these devices may be bulky, noisy to operate, and difficult to seal from contaminants. Moreover, both the electrical and mechanical structures of such input mechanisms may be prone to failure, resulting in a limited life.

Input devices made of touch-sensitive materials may provide user input functionality while reducing or eliminating some of the mechanical structures and electrical contacts used in conventional input devices. The resulting input devices may be more robust, longer-lasting, and more easily integrated into other devices. As used herein, touch-sensitive materials may be any deformable and/or elastomeric materials having at least one electrical characteristic that changes in response to deformation of the material.

One example of touch-sensitive materials is quantum tunneling material. The term "quantum tunneling" may refer to the quantum mechanical phenomenon in which a charge (e.g., a flow of electrons) passes through a medium that it generally could not pass through. For example, an electrical charge does not typically travel well through an insulating material (e.g., silicone). If conductive particles are suspended in a matrix of insulating material, however, quantum tunneling effects may allow a charge to pass between conductive particles, even though the conductive particles are separated by interstitial insulating material.

Quantum tunneling materials are a class of materials in which quantum tunneling effects cause the electrical resistance of the material to change in response to deformation of the material. For example, quantum tunneling materials may be formed from a deformable matrix material having particles of a conductive material suspended therein. When the matrix material is in an undeformed state, a value of the electrical resistance of the quantum tunneling material may be relatively high. When the matrix material is in a deformed state, such as after a user applies direct pressure on the material with a finger, the value of the electrical resistance may drop to a lower value. An electronic device can sense the resistance across the quantum tunneling material (using sensing circuitry coupled to electrodes that are in contact with quantum tunneling material) and detect whether a user has pressed on the material. In this way, quantum tunneling materials (or other touch-sensitive materials) may replace or supplement conventional mechanical buttons as inputs to the electronic device. Quantum tunneling materials are described herein.

Touch-sensitive materials, such as quantum tunneling materials, may be employed in electronic devices to provide attractive, robust input mechanisms and other force-sensitive components. For example, the back surface of a smartphone may have one or more input regions of touch-sensitive materials, allowing a user to interact with the smartphone in new and interesting ways. Moreover, because the input regions may not require buttons, dome switches, or other mechanical components, the surface may be thinner than would be possible with traditional input devices. As another example, a watch band coupled to a smartwatch may use touch-sensitive materials to create input regions for interacting with the smartwatch. The input regions can be seamlessly integrated with the surrounding surface of the band.

Touch-sensitive materials may also be used to create other types of input mechanisms. For example, touch-pads may be formed from an area of touch-sensitive material having a grid of input regions. By detecting resistance changes across the various input regions, an electronic device can determine the location of a touch force within the area of touch-sensitive material. As another example, a touch-sensitive material may be included in a band of a wearable electronic device (e.g., a smartwatch) to allow the device to determine whether or not it is attached to a user.

Embodiments of electronic devices (and accessories for electronic devices) that include touch-sensitive materials are discussed below with reference to FIGS. 1A-7D. However, those skilled in the art will readily appreciate that the detailed description given herein with respect to these Figures is for explanatory purposes only and should not be construed as limiting.

Figure 2A:
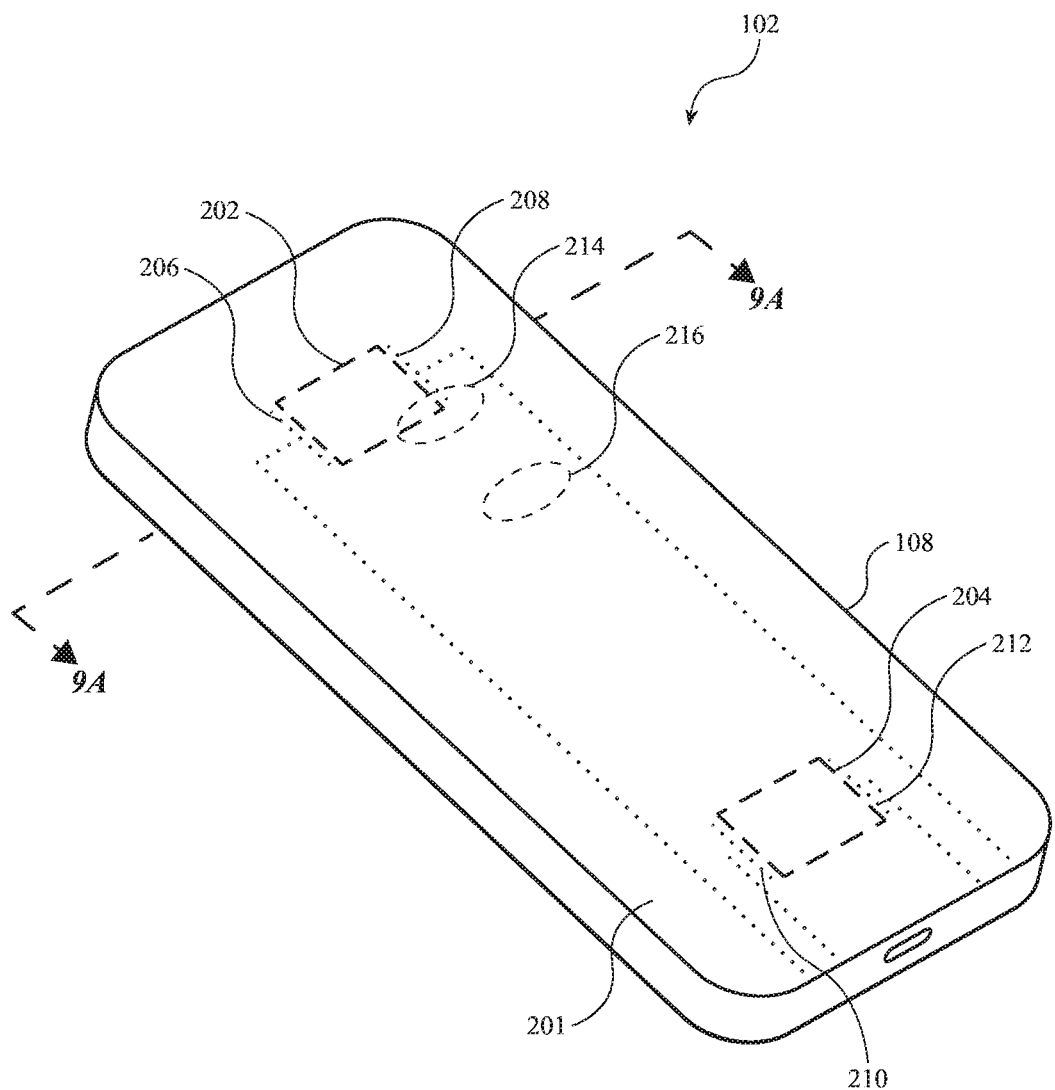
FIGS. 2A-4 show isometric views of example cases that include touch-sensitive materials.

FIG. 1A depicts an exemplary electronic device 100 and an exemplary case 102 for the electronic device 100. As described herein, either or both of the electronic device 100 and the case 102 may include input regions that are formed from or otherwise include touch-sensitive materials. For example, as shown in FIG. 2A, input regions 202 and 204 may be disposed on or form part of a back surface of a case or a device.

The device 100 includes a housing 104 and a display device 106 forming at least a part of a front surface of the device 100. The device 100 also includes internal components, such as processors, memory, circuit boards, batteries, sensors, and the like. Exemplary components of the device 100, and their functions, are described with respect to FIG. 10.

The case 102 includes a body 108 defining an interior volume 109 into which the device 100 is received. The case 102 also includes a connector 110. The connector 110 operatively couples the case 102 to the device 100 via a connection port 112. For example, if the case includes touch-sensitive materials (such as the input regions 202, 204 described with respect to FIG. 2A), the connector 110 may transmit electrical or other signals between the touch-sensitive materials and the device 100. As another example, if the case includes a supplemental battery, the connector 110 may transmit electrical power to the device 100.

The body 108 of the case 102 may be a unitary, monolithic structure formed from an elastomeric material, such as silicone, thermoplastic polyurethane, or any other appropriate material. Alternatively, the body 108 may be formed from multiple discrete parts (of the same or different materials). For example, the back of the case may be formed from an elastomeric material, while other portions of the case (e.g., the sides and a bezel) may be formed from a rigid material.

Figure 1B:
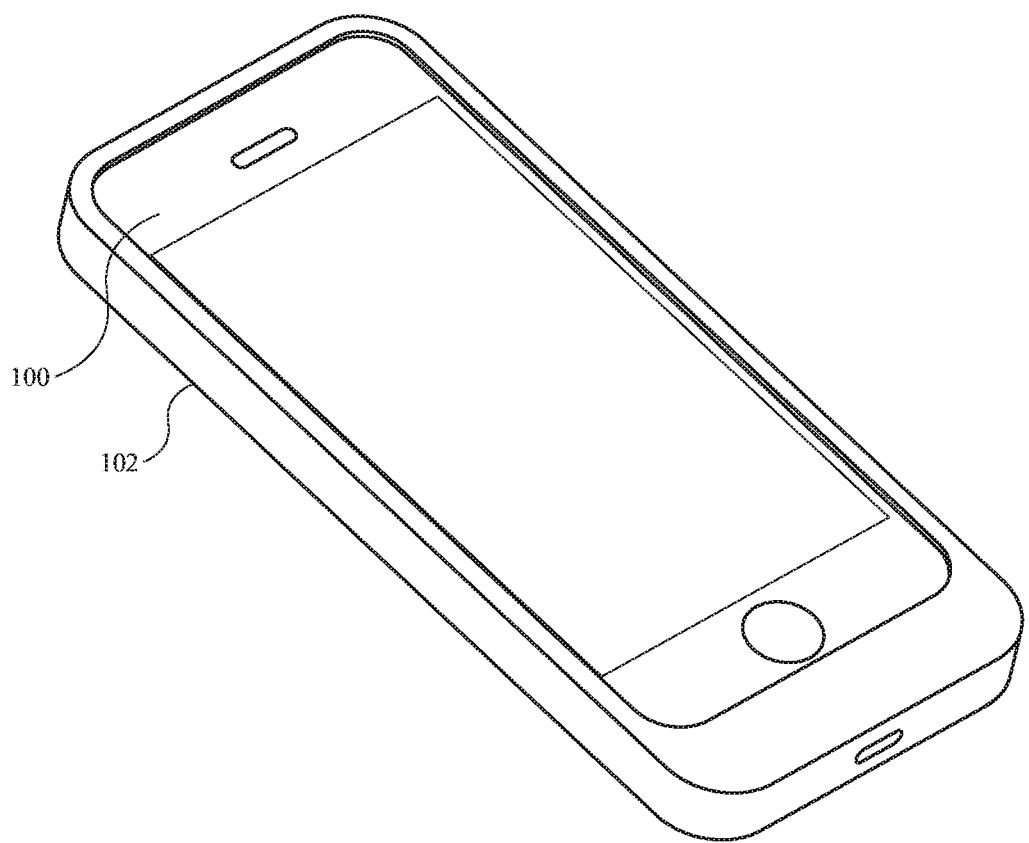

FIG. 1B depicts the device 100 disposed within the case 102. The connector 110 is coupled to the connection port 112, thus operatively coupling the case 102 to the device 100.

While FIGS. 1A-1B show a smartphone and a smartphone case, these are merely examples of devices or components that may include touch-sensitive materials. Other possible devices include, without limitation, smartwatches, laptop computers, tablet computers, input accessories (e.g., mice, keyboards, touchpads), home appliances, remote controls, and the like, as well as cases and/or accessories for such devices.

FIG. 2A shows the case 102, where a back 201 of the case 102 includes a first input region 202 and a second input region 204. The back 201 is configured to cover a nondisplay portion of the device 100. The back 201 may be a single monolithic layer that forms both an interior and an exterior surface of the case 102.

The input regions 202, 204 are formed from a quantum tunneling material. As described above, quantum tunneling materials are a class of materials in which quantum tunneling effects cause the electrical resistance of the material to change (e.g., decrease) in response to deformation of the material. The quantum tunneling material of the input regions 202, 204 may be a silicone material doped with conductive particles. (Other touch-sensitive materials may be used instead of or in addition to quantum tunneling materials.)

The case 102 also includes a first electrode pair including first electrodes 206 and 208 in contact with the quantum tunneling material of the first input region 202, and a second electrode pair including second electrodes 210, 212 in contact with the quantum tunneling material of the second input region 204. More or fewer electrodes may be used in some embodiments.

The electrodes may be coupled to a sensing circuit (FIG. 10) that is coupled to or otherwise part of the case 102. The sensing circuit of the case 102 may sense and/or measure the electrical resistance (or other electrical characteristics) of the quantum tunneling material of the input regions 202, 204, and be operatively coupled to the device 100 (e.g., via the connector 110) to indicate that an input has been detected. Alternatively, the electrodes may be coupled directly to the connector 110 such that the device 100 senses and/or measures electrical characteristics of the input regions using a sensing circuit and/or processing unit in the device 100.

The electrodes 206, 208, 210, 212 are encapsulated in the material of the body 108. For example, when forming the body 108, electrodes may be placed in a mold cavity, and then an elastomeric material may be introduced into the mold cavity to encapsulate the electrodes and form the body 108. Other components may be also introduced into the mold cavity prior to introducing the elastomeric material, such as the connector 110, a sensing circuit, etc.

The electrodes are formed from any appropriate material or component that facilitates measurements of electrical properties of the input regions. For example, the electrodes may be insulated or bare wires, conductive (e.g., metallic) plates or bars, circuit traces, carbon fibers, doped regions of the case body material, or the like. Moreover, the number of electrodes in FIG. 2A, as well as the electrode locations, paths, and termination points are merely exemplary, and an input region may include more or fewer electrodes than are shown. The electrodes and/or conductors coupled to the electrodes may be routed through the case 102 in any appropriate way, and may be operatively coupled to any appropriate location or component, such as a sensing circuit (FIG. 10) or the connector 110.

The dashed lines illustrating the input regions 202, 204 represent regions that, when pressed by a user, may provide an electrical response that may be detected by the device 100 and/or the case 102, and used as an input. The input regions 202, 204 do not necessarily define a discrete component or an area that is distinct from surrounding areas of the case 102. For example, the input regions 202, 204 may be at least partially surrounded by a larger area that is also formed from the quantum tunneling materials.

Figure 2B:
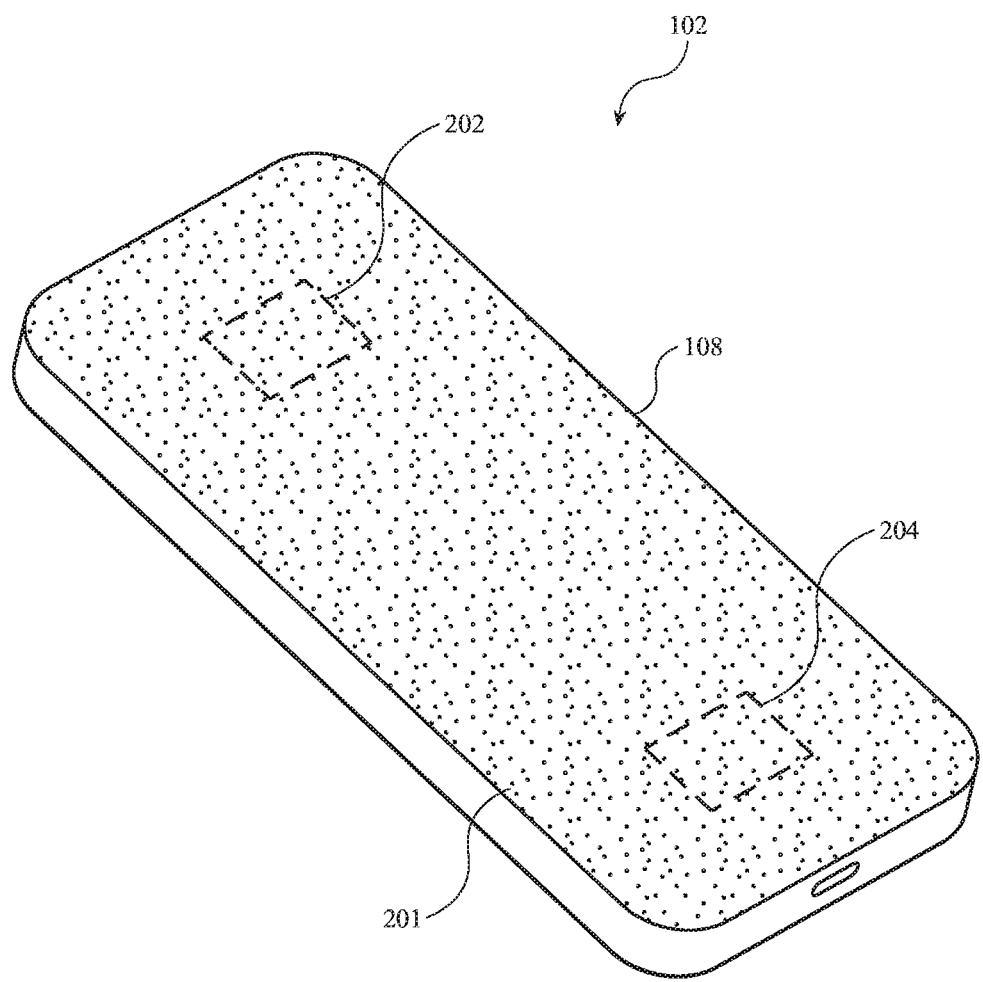

FIG. 2B shows an embodiment of the back 201 of the case 102 where the back is a monolithic member formed entirely (or substantially entirely) from silicone doped with conductive particles (represented by stippling). As there may be no difference in the composition of the material between the input regions 202, 204 and the remainder of the back 201, the input regions may correspond to an area or region between corresponding electrodes of an electrode pair (e.g., electrodes 206, 208, 210, and 212). That is, the placement, size, and/or shape of an input region may depend on and/or be defined by the placement of the electrodes within the quantum tunneling material.

Where the input region and the surrounding material are both formed from quantum tunneling material, a deformation of the material that is between two corresponding electrodes may be detected independently of deformations of the surrounding material. In particular, a deformation between two corresponding electrodes results in a greater change to the electrical characteristic than a deformation that is further away from the area. For example, a touch force from a user input at area 214 may cause a larger change to the resistance measured between electrodes 206 and 208 than a touch force at area 216 (FIG. 2A). Accordingly, while the entire back 201 of the case 102 (and indeed the entire body 108 of the case 102) may be formed from a quantum tunneling material, the case 102 and/or the device 100 can differentiate between touches that occur between electrodes and touches at other areas that are not between electrodes and hence not intended as input regions.

Figure 2C:
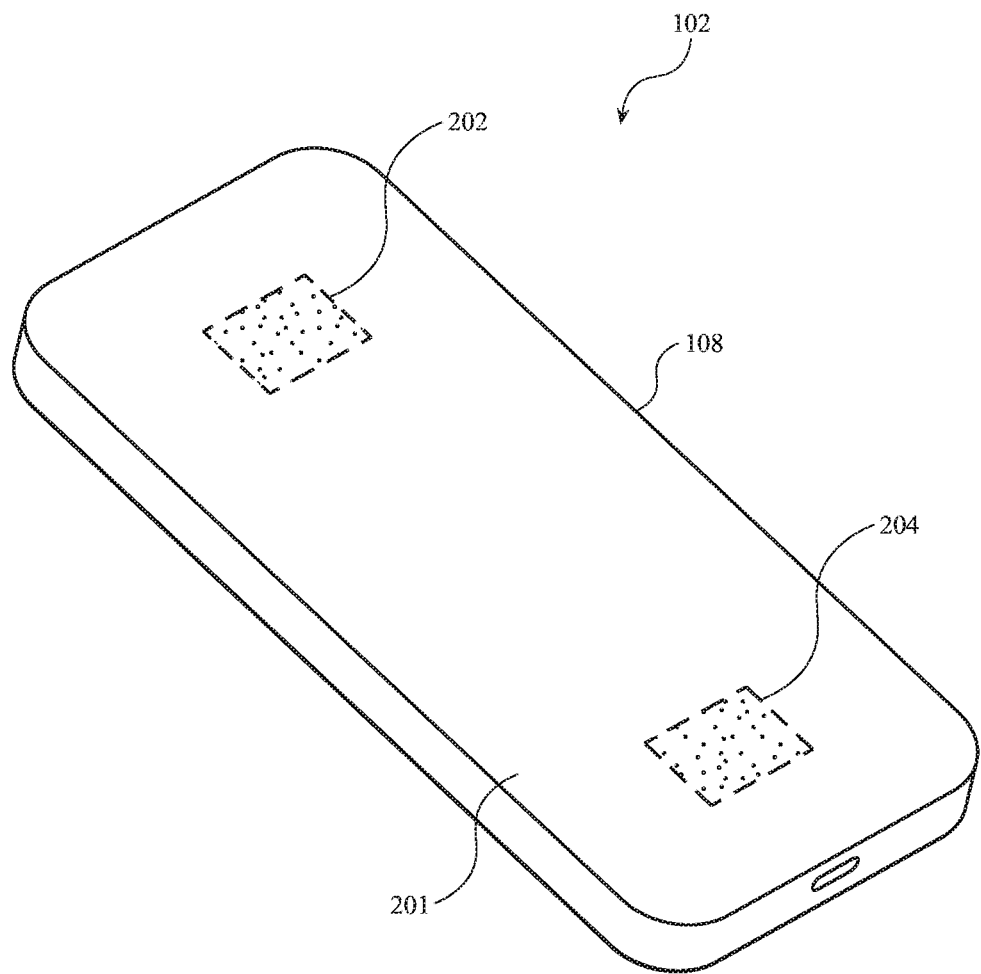

FIG. 2C shows another embodiment of the back 201 of the case 102 where the back 201 is a monolithic member formed entirely (or substantially entirely) from silicone, but only the input regions 202, 204 are doped with conductive particles (represented by stippling). Thus, the input regions 202, 204 have a different composition than surrounding areas of the case 102.

In the foregoing examples, the input regions 202, 204 (and/or actuation surfaces of the input regions 202, 204) may form a continuous surface with the rest of the back 201. For example, because the input regions do not require a separate actuation member in order to provide input functionality, the surface of the case need not be interrupted with apertures, seams, gaps, grooves, or the like. In some embodiments, however, input regions 202, 204 are visually differentiated from surrounding areas by colors, images, textures, logos, or the like. For example, the input regions may be dyed or otherwise formed from a material having a different color than surrounding areas.

Alternatively, the input regions 202, 204 may be differentiated from the surrounding areas by physical features, such as grooves, protrusions, gaps, or the like. For example, a protrusion or dome-like portion of material may be formed at the input region. As yet another example, a groove may be formed around the input region. In such cases, the input regions 202, 204 and the surrounding areas may be formed from an unbroken piece of material. For example, the grooves may be indentations molded into an otherwise continuous piece of material.

Instead of monolithically forming the input regions in a portion of the case 102, as described with respect to FIGS. 2A-2C, the input regions may be discrete pieces of quantum tunneling material that are co-molded with, encapsulated in, bonded to, or otherwise coupled to the case 102. For example, one or more patches of a quantum tunneling material may be bonded to an interior surface of the back 201 of the case 102 (e.g., within the interior volume of the case) to form the input regions 202, 204. Thus, the back 201 acts as an outer layer of the case 102, and forms an external surface of the case 102, and the quantum tunneling material is disposed below the outer layer. As another example, patches of a quantum tunneling material may be encapsulated within the body 108 at the input regions by placing the patches into a mold cavity, and thereafter introducing silicone (or any other appropriate material) into the mold cavity. A deformation of the outer surface of the back 201 in an area directly above a patch causes the patch to deform, resulting in detection of a touch event at the corresponding input region.

Figure 3:
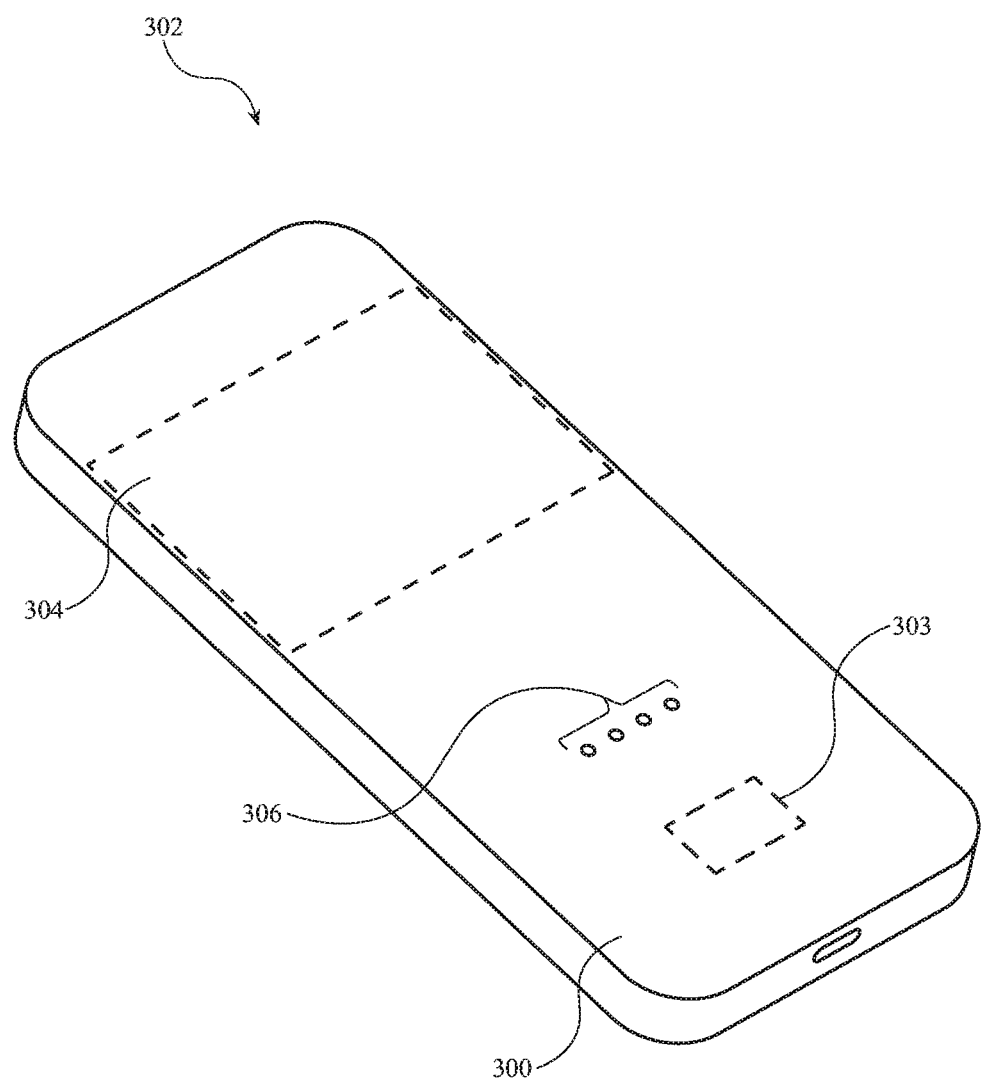

FIG. 3 shows a back surface 300 of a case 302. The case 302 is an embodiment of the case 102 that includes a battery and in which quantum tunneling materials are used to form an input region 303. The input region 303 may be formed in any appropriate manner and with any appropriate materials, as described above with respect to input regions 202 and 204. For example, the input region 303 may be an area of the case 302 formed from silicone doped with conductive materials. (Other touch-sensitive materials may be used instead of or in addition to quantum tunneling materials.)

The case 302 includes a battery 304. The battery 304 may be at least partially encapsulated within the body of the case 302, for example, by co-molding the battery into the case 302, or by inserting the battery 304 into a recess in the case. The recess may open into the interior volume of the case, allowing the battery to be inserted into the recess without requiring an opening on the back surface. The back surface 300 of the case 302 includes a protrusion corresponding to the location of the battery 304. Other embodiments may not have a protrusion, instead having a back surface 300 that defines a single plane.

The battery 304 may be used as a supplemental battery for an electronic device disposed within the case 302 (e.g., the electronic device 100). In such cases, the battery may be coupled to a connector (e.g., the connector 110) to provide electrical power to the device 100. The case 302 may also include additional components associated with the battery 304, such as charging circuitry, a processing unit, and the like, each of which may be encapsulated in the body of the case along with the battery 304.

The case 302 also includes battery charge indicators 306 facing outward from the case 302 and operatively coupled to the input region 303 and the battery 304 (and/or charging circuitry, a processing unit, or the like). The battery charge indicators 306 include a plurality of light emitting components, such as light emitting diodes. When a touch force is detected at the input region 303 (e.g., by a sensing circuit and/or a processing unit, not shown), the battery charge indicators 306 indicate an amount of charge remaining by illuminating in proportion to the charge level of the battery 304 (and/or a battery of an electronic device that is coupled to the case 302). For example, if the battery 304 is fully charged, all of the battery charge indicators 306 may illuminate; if the battery 304 is nearly empty, only one of the indicators 306 may illuminate.

The input region 303, and in particular the quantum tunneling material of the input region, may be coupled to the battery 304, the connector 110 (FIG. 1A), a sensing circuit, a processing unit, the battery charge indicators 306, and/or other components, via one or more electrodes (not shown). The electrodes may be disposed in or on the case 302 in any appropriate way. For example, they may be encapsulated in the material of the case 302 by insert molding the electrodes along with the case material.

Figure 4:
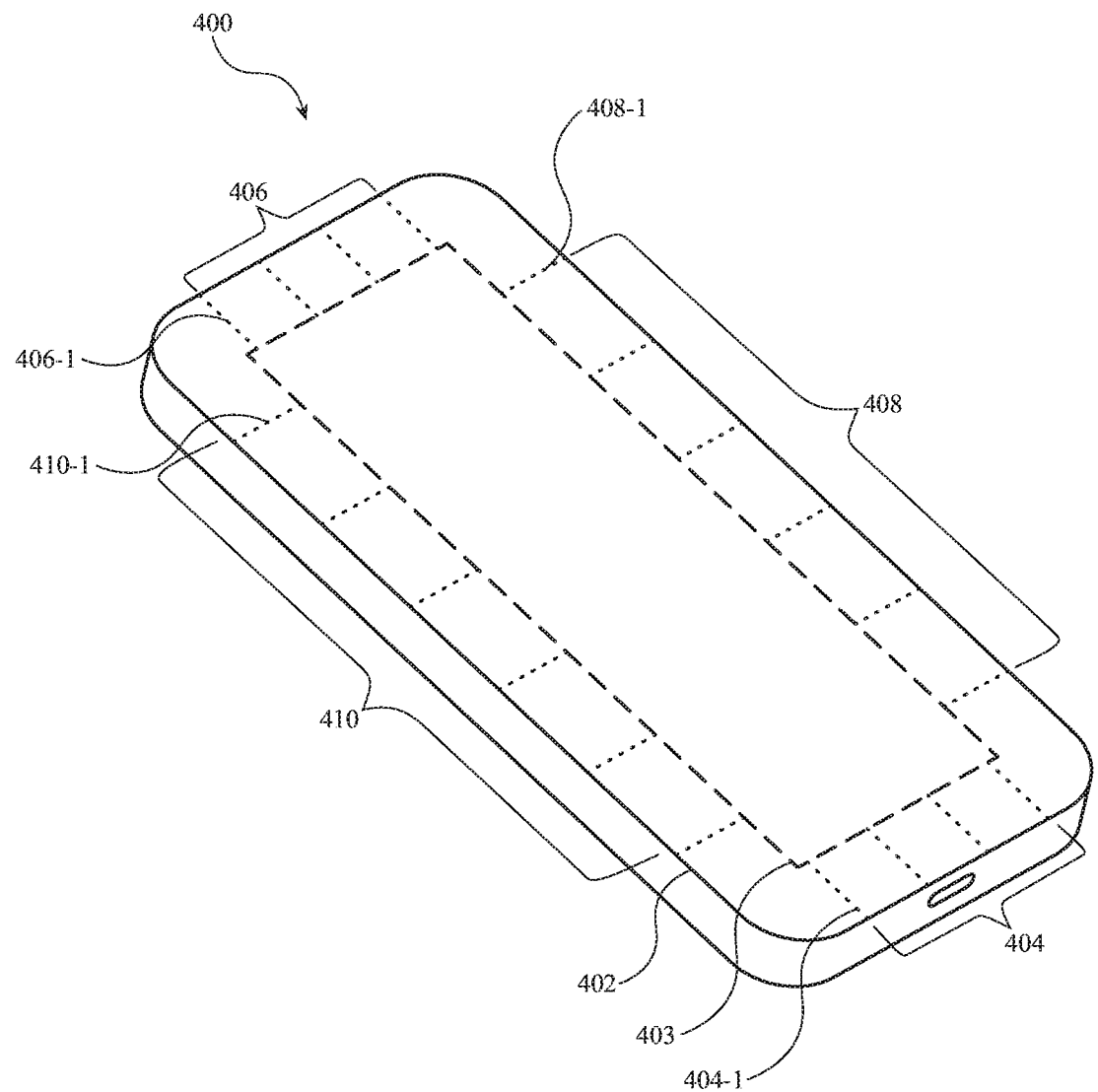

FIG. 4 shows a case 400 (which may correspond to the case 102), where a back surface 402 of the case 102 includes a touch-pad input region 403 that can detect the location of touch events within the input region 403. The input region 403 includes quantum tunneling materials, and may be formed in any appropriate way. For example, as described above, the body of the case 400 may be formed entirely or substantially entirely from silicone doped with conductive particles, and the input region 403, and in particular a plurality of intersecting input regions forming the input region 403, may be defined by the placement of electrodes within the case 400. Alternatively, the input region 403 can be a distinct area of quantum tunneling material that is coupled to the case, or a distinct portion of the case that is doped with conductive particles. (Other touch-sensitive materials may be used instead of or in addition to quantum tunneling materials.)

The case 400 includes a first set of electrode pairs 404, 406 and a second set of electrode pairs 408, 410, where each electrode is in contact with the quantum tunneling material of the input region 403. Corresponding electrodes of a respective electrode pair are disposed on opposite sides of the input region 403. In particular, each respective electrode pair (e.g., a electrodes 410-1 and 408-1) defines a respective elongate user input region extending along a direction from one electrode (e.g., electrode 410-1) to a corresponding electrode of the electrode pair (e.g., electrode 408-1). Because the two sets of electrode pairs are disposed along perpendicular sides of the input region 403, the elongate user input regions formed by the first set of electrode pairs are transverse to those formed by the second set of electrode pairs and thus form a grid of user input regions. Thus, the first set of electrode pairs 404, 406 defines a first set of elongate user input regions, each of which extends along a first direction, and the second set of electrode pairs 408, 410 defines a second set of elongate user input regions, each of which extends along a second direction that is transverse to the first direction.

By detecting values of electrical resistance through the user input regions, the case 400 and/or a device coupled to the case 400 (e.g., device 100) can determine the location in the input region 403 where a touch event occurred. For example, electrodes 408-1 and 410-1 facilitate detection of the electrical resistance value through a first area that is generally between the electrodes 408-1 and 410-1, and electrodes 404-1 and 406-1 facilitate detection of the electrical resistance value through a second area that is generally between the electrodes 404-1 and 406-1. Thus, a touch event at or near the intersection of the first and second areas will cause a change in the resistance that is detected through electrodes 404-1 and 406-1 and electrodes 408-1 and 410-1. In this way, locations of touch events may be determined, and different actions may be taken by a device and/or a case in response to inputs at different locations.

The input region 403 (and any associated sensing circuits and/or processing units) may also detect gestures and/or multi-touch events (e.g., swipes, pinches, multi-finger touch events, and the like). Gestures and/or multi-touch events may cause the electronic device 100 to perform any appropriate function, such as scrolling, user interface navigation, or the like.

The case 400 may also include a sensing circuit and/or processing unit (not shown) to which the sets of electrode pairs 404, 406, 408, 410 are operatively coupled. The sensing circuit and/or processing units may sense and/or measure electrical characteristics of the input region 403 via the electrodes, determine locations of touch events, and communicate the locations of the touch events to the device 100 (e.g., via the connector 110). Alternatively, the electrode pairs 404, 406, 408, and 410 are coupled to a sensing circuit and/or processing unit of an electronic device to which the case 400 is coupled (e.g., the device 100), and the device determines the locations of touch events.

The number of electrodes in FIG. 4, as well as the electrode locations, paths, and termination points are merely exemplary, and an input region may include more or fewer electrodes than are shown. Moreover, portions of the electrodes are omitted from FIG. 4 for clarity. It will be understood that the electrodes may be routed through the case 400 in any appropriate way, and may terminate at any appropriate location or component, such as at a sensing circuit, a processing unit, the connector 110, or the like.

FIGS. 2A-4 describe touch-sensitive materials that are disposed in or on cases that are configured to receive electronic devices therein. However, the same discussions may apply equally to touch-sensitive materials incorporated with housings of electronic devices. For example, the input regions 202 and 204 and the electrodes 206, 208, 210, and 212 in FIG. 2A may be included in the back (or other surface) of the housing 104 of the electronic device 100 depicted in FIG. 1A.

Figure 5:
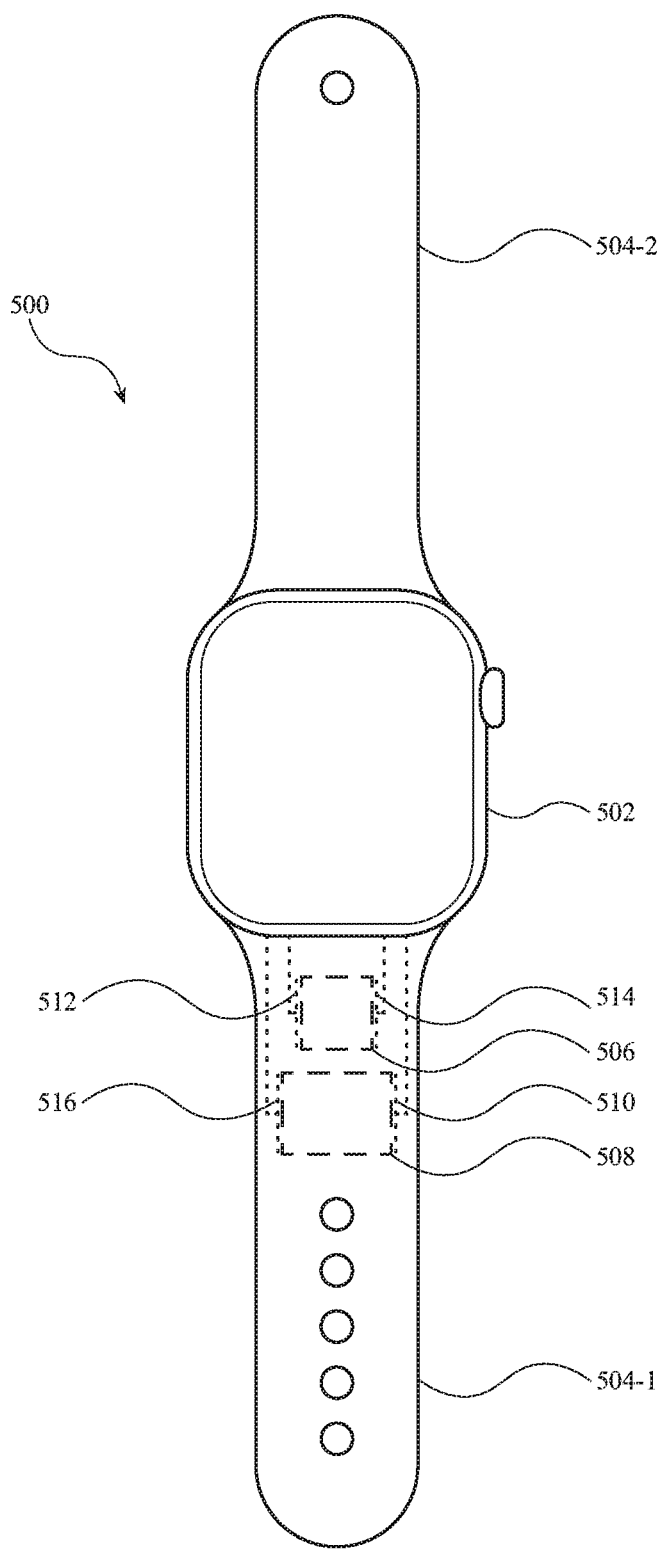
FIG. 5 shows an example smartwatch that includes touch-sensitive materials.

FIG. 5 depicts a watch 500 that includes quantum tunneling materials. The watch 500 includes a housing 502, which may contain internal components, such as processing units, memory, circuit boards, batteries, sensors, and the like. Exemplary components of the watch 500, and their functions, are described with respect to FIG. 10.

The watch 500 includes a band that includes a first strap 504-1 and a second strap 504-2, each coupled to the housing 502. Collectively, the first and second straps are referred to as the band 504. The band 504 is configured to couple the wearable electronic device to a user, such as on the user's wrist. The band 504 includes a first input region 506 and a second input region 508, each formed from a touch-sensitive material, such as a quantum tunneling material or any other material that can be used to facilitate sensing or detecting touch forces corresponding to user inputs.

The band 504 also includes first electrodes 514 and 516 in contact with the quantum tunneling material of the first input region 506, and second electrodes 510, 512 in contact with the quantum tunneling material of the second input region 508. The electrodes are operatively coupled to a sensing circuit and/or a processing unit of the watch 500, which senses and/or measures electrical characteristics of the quantum tunneling materials of the input regions 506, 508 via the electrodes.

The input regions 506, 508 may be integrated with or otherwise coupled to the band 504 in any appropriate manner, such as described above with respect to FIGS. 2A-4. For example, the band 504 may include a monolithic silicone strap, and the input regions 506, 508 may correspond to areas of the silicone material that are doped with conductive particles. As another example, the band 504 may include a monolithic silicone strap that is doped with conductive particles throughout all (or a substantial portion) of the silicone material. In this case, the input regions 506, 508 may be defined by the particular placement of electrodes within the silicone material. As yet another example, patches of quantum tunneling material may be insert molded with silicone to encapsulate the patches within the band 504. Moreover, the input regions 506, 508 may be single-stage input mechanisms or multi-stage input mechanisms. Multi-stage input mechanisms are discussed with respect to FIGS. 9A-9C.

The input regions 506, 508 may not be outwardly distinguishable from one another or from the remainder of the band 504. For example, actuation surfaces of the input regions 506, 508 (and/or actuation surfaces of the input regions 506, 508) may define a continuous surface (e.g., the surface of the band may not be interrupted with apertures, seams, gaps, grooves, or the like). Moreover, the input regions 506, 508 may not be visually differentiated from surrounding areas of the band 504. Accordingly, the band 504 can provide input regions without cluttering the appearance of the band 504.

Alternatively, the input regions 506, 508 may be physically and/or visually differentiated from each other and surrounding areas of the band 504. For example, the input regions 506, 508 may be outlined, dyed, or otherwise formed from materials having different colors than surrounding areas. As another example, the input regions 506, 508 may be set apart from each other and/or surrounding areas by a groove enclosing the input regions.

The watch 500 may take any appropriate action upon detection of a touch event at one of the input regions 506, 508. For example, a touch event at one of the input regions may cause the watch to enter or emerge from a "sleep" mode, display the time, display messaging information (e.g., recent emails, text messages, telephone calls, or the like), scroll through or among elements of a graphical user-interface, control media playback, answer or terminate a telephone call, or any other appropriate function.

One of the first or the second input regions may be configured to facilitate detection of whether the watch 500 is attached to or detached from the body of a user. In particular, the bending of the band 504 when a user couples the watch to his or her wrist causes the quantum tunneling material of the first input region 506 to deform, and thus changes the electrical characteristic (e.g., resistance) of the quantum tunneling material. The sensing circuit and/or processing unit of the watch 500 detects and/or measures the change in the electrical characteristic and determines whether the band is coupled to a user, for example, by determining whether the electrical characteristic satisfies a first threshold. Once the watch 500 determines whether or not it is coupled to a user, the watch 500 may take (or refrain from taking) certain actions. For example, the watch 500 may deactivate vibration notifications if the device is not attached to a user. As another example, the watch 500 may go into a sleep mode if it is not attached to a user.

A single input region may be configured for detecting whether the watch 500 is attached to or detached from the body of a user, as well as for detecting touch events. In such cases, the watch 500 may be configured to determine whether deformation of the band results in the electrical characteristic of the touch-sensitive material satisfying a first and/or a second threshold. If the electrical characteristic satisfies the first threshold (e.g., the electrical resistance value exceeds a first value), the watch 500 determines that the watch is applied to the body of a user. If the electrical characteristic satisfies the second threshold (e.g., the electrical resistance value exceeds a second value, which may be less than or greater than the first value), the watch 500 determines that direct pressure has been applied to the input region (e.g., corresponding to a touch event). The watch may perform (or refrain from performing) different actions based on whether the electrical characteristic satisfies the first or the second threshold.

While the watch 500 has two input regions, more or fewer input regions may be included in different embodiments. Moreover, the location of the input regions 506, 508 on the band 504 are merely exemplary, and some embodiments may place input regions in different locations on the band. For example, an input region that is configured to determine whether the watch 500 is attached to or detached from the body of a user may be located in any area that experiences sufficient deformation when the watch 500 is attached to a user. As another example, input regions may be located on either or both straps 504-1, 504-2.

Instead of or in addition to discrete input regions 506, 508, the band 504 may include a touch-pad input region in which the locations of touch events within the input region can be determined. An example arrangement of quantum tunneling materials and electrodes that may be used to form a touch-pad input region is discussed above with respect to FIG. 4, and a similar implementation may be used in the band 504. A touch-pad input region on the band 504 may facilitate the recognition of gestures and multi-touch inputs. For example, a swipe gesture on the touch-pad input region may result in scrolling of a graphical user interface of the watch 500. As another example, a swipe gesture on the band may cause the volume of media being controlled by the watch 500 to increase or decrease. As yet another example, a swipe gesture may cause the watch 500 to skip between media files in a media queue (e.g., a "skip forward" or "skip backward" function).

Figure 6A:
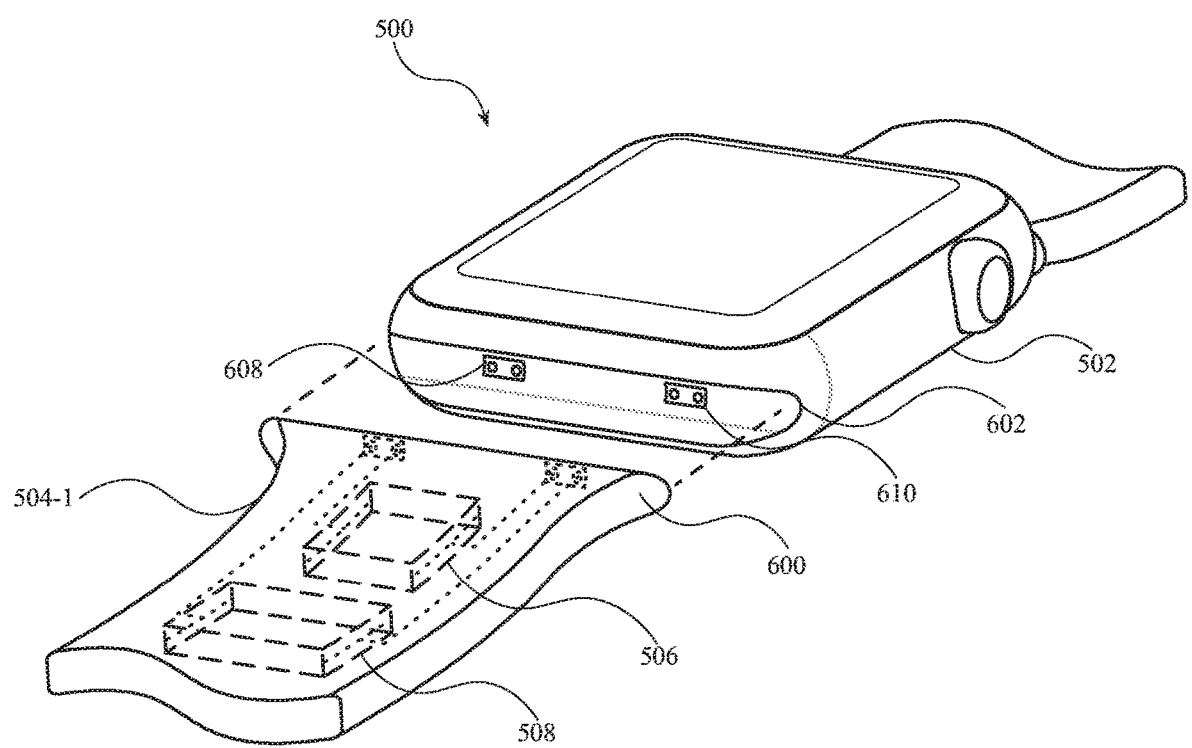
FIG. 6A shows an exploded isometric view of a portion of an example wearable device that includes touch-sensitive materials.
Figure 6B:
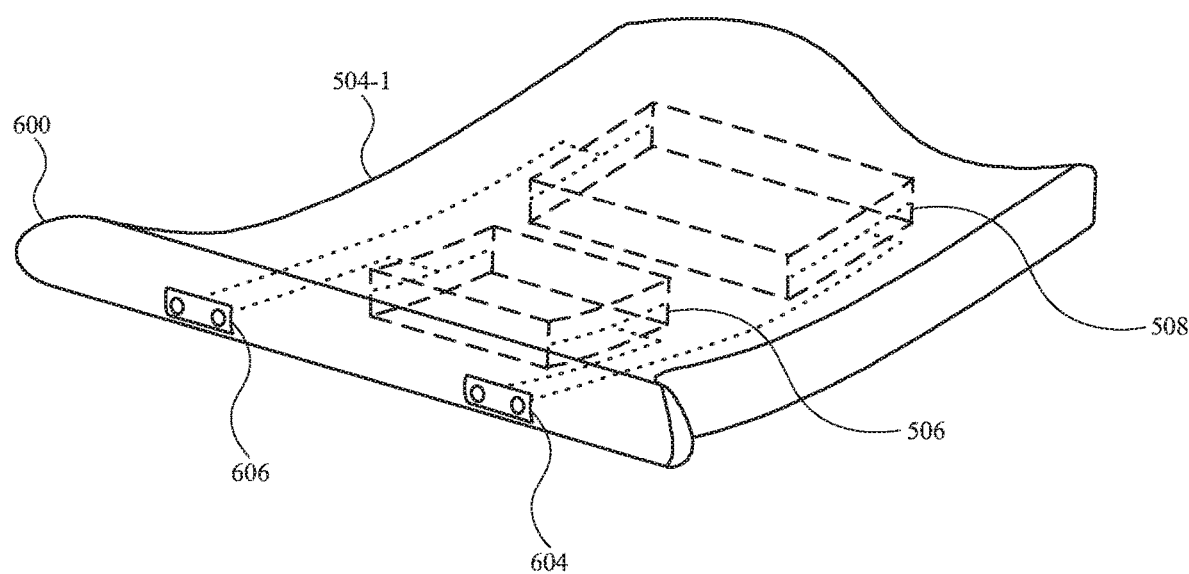
FIG. 6B shows an isometric view of an example band for a smartwatch.

FIG. 6A depicts a portion of the first strap 504-1 detached from the housing 502. FIG. 6B depicts an end of the first portion of the first strap 504-1. The first strap 504-1 includes a lug 600 that is configured to retain the first portion of the first strap 504-1 to the housing 502. The housing 502 includes a lug receptacle 602 into which the lug 600 is received.

The lug 600 includes first and second electrical contacts 604, 606 (FIG. 6B) that are operatively coupled to one or more of the electrodes 512, 514, 516, 518 (FIG. 5). The housing 502 includes third and fourth electrical contacts 608, 610 that are configured to couple to the first and second electrical contacts, respectively. When the first portion of the first strap 504-1 is coupled to the housing 502 via the lug 600 and the lug receptacle 602, the electrical contacts of the band and the housing operatively couple the input regions 506, 508 to a sensing circuit and/or processing unit of the watch 500.

The first portion of the first strap 504-1 may be configured to be removably coupled to the watch housing 502. In such cases, the electrical contacts 604, 606, 608, 610 may be quick-release style contacts such that a user can remove and/or swap bands of the watch 500 without damaging the watch and/or the band, and without needing to manually re-connect wires, electrodes, or the like.

While FIGS. 5-6B describe a watch 500 that includes quantum tunneling materials, it will be understood that this is merely one example of the many different electronic devices, and in particular wearable electronic devices, that may include quantum tunneling materials. For example, the discussion relating to the watch 500 may apply to a heart-rate monitor (or other biometric sensing/monitoring device), a GPS device, a body-worn music player, or the like.

Figure 7A:
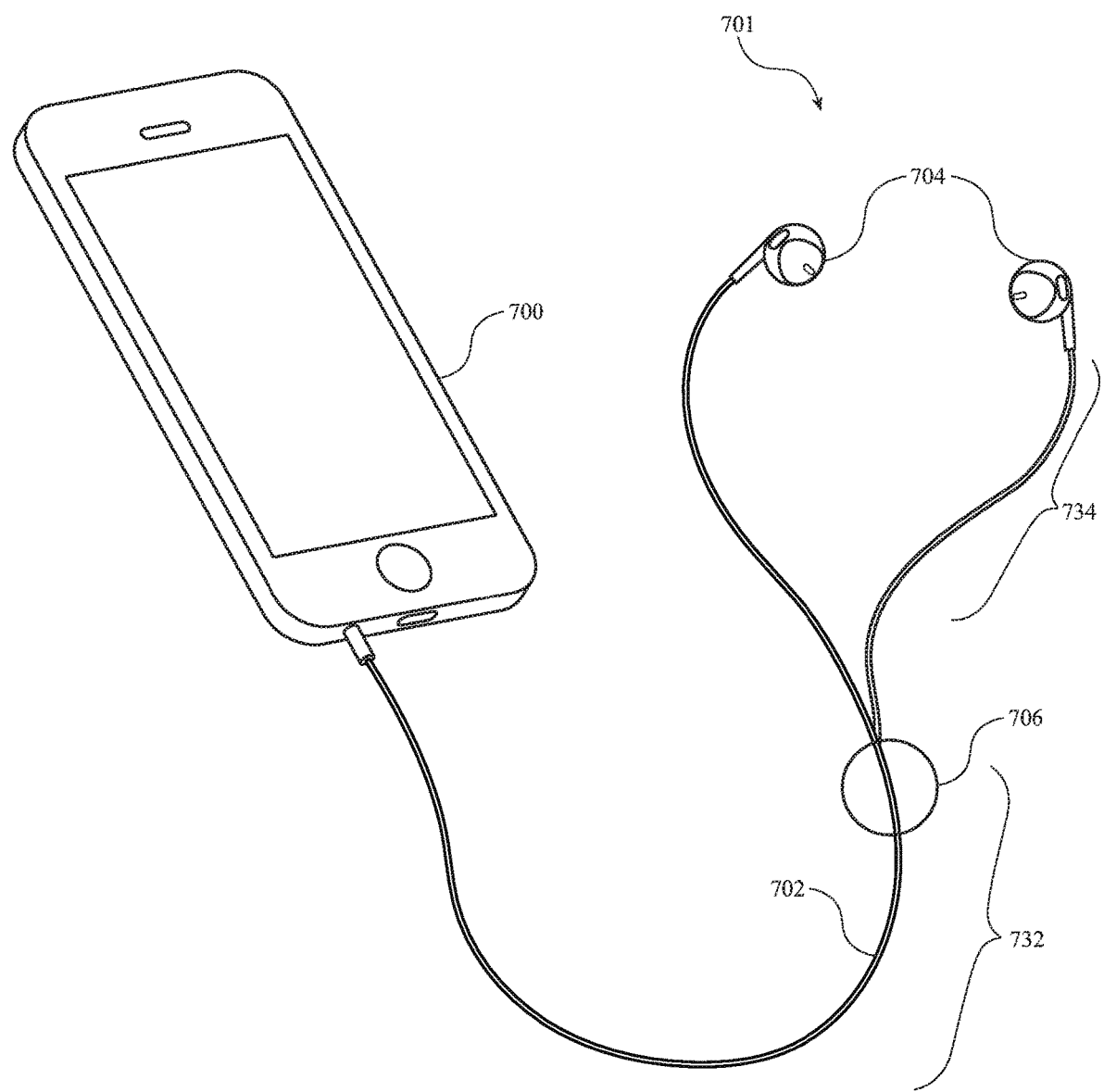
FIG. 7A shows an isometric view of an example electronic device with a headset.

FIG. 7A depicts a smartphone 700 and a headset 701 coupled to the smartphone 700, where the headset includes quantum tunneling materials for controlling aspects of the smartphone 700. (Other touch-sensitive materials may be used instead of or in addition to quantum tunneling materials.)

The headset 701 includes a cord 702 coupled to speakers 704. The speakers 704 are configured to fit in a user's ears to present audio from the smartphone 700. The headset 701 optionally includes a microphone (not shown) that picks up audio signals from a user for transmission to the smartphone 700.

The headset 701 also includes quantum tunneling materials that allow the headset 701, or portions thereof, to act as an input device to the smartphone 700. In particular, the headset cord 702 includes a jacket 716 (FIG. 7C) that surrounds and protects the conductors 714 (FIG. 7C) that couple the speakers 704 to the smartphone 700. The jacket 716 is formed entirely or partially from a quantum tunneling material, and electrodes are in contact with areas of the jacket 716 that are configured to receive user inputs. Furthermore, the jacket 716 may include multiple input regions, allowing the user to control multiple functions with the headset 701. Accordingly, a user can simply squeeze on a portion of the jacket 716 to cause the smartphone to take an action. Actions that can be controlled by input regions on a headset 701 include but are not limited to media playback controls (e.g., play, pause, skip, volume), voice/video call controls (e.g., initiate call, terminate call, volume), and user interface controls (e.g., scrolling operations).

FIG. 7B depicts an expanded view of the headset cord 702 corresponding to area 706 in FIG. 7A. The headset cord 702 includes the jacket 716. Electrodes 710 and 712 are within the jacket 716. The electrodes 710, 712 are in contact with an input region 708 and are operatively coupled to the smartphone 700 (e.g., through a connector such as a 3.5 mm audio input receptacle and plug).

The input region 708 is formed from an elastomeric material doped with conductive particles. In particular, the jacket 716 is formed from an elastomeric material such as silicone, and at least the area of the jacket corresponding to the input region 708 includes conductive particles, such as carbon. The electrodes 710, 712, which are in contact with the input region, facilitate sensing and/or measurement of electrical resistance through the input region 708. For example, the electrodes 710, 712 are operatively coupled to the smartphone 700, which detects values of electrical resistance through the input region 708. If the input region 708 is deformed (e.g., as the result of a user pressing or squeezing the input region 708), the smartphone 700 detects a change in resistance and registers a user input. The smartphone 700 then takes one or more actions in response to the user input, as described herein.

FIG. 7C is a cross-section of the headset cord 702 taken across line 7C-7C in FIG. 7B. The jacket 716 is doped with conductive particles 718 to form a quantum tunneling material. The jacket 716 encases the conductors 714 (which may include three, four, or more insulated conductors) that couple the speakers 704 to the smartphone 700. The conductors 714 carry audio signals from the smartphone to the speakers 704. The jacket also encases the electrodes 710, 712. The electrodes 710, 712 are not insulated in the input region 708, so that they can facilitate sensing and/or measurement of the electrical resistance of the jacket 716. As described herein, however, other portions of the electrodes 710, 712 may be insulated.

Input regions of the headset 701 may be defined in several possible ways. For example, where the headset 701 includes only one input region, as shown in FIG. 7B, the input region may be a distinct area of the jacket 716 that includes conductive particles. In such a case, the electrodes may be uninsulated from the jacket material (e.g., they may be bare conductors embedded in the jacket 716), because deformations of the areas of the jacket that lack conductive particles will not result in a change in an appreciable or measurable change in resistance between the electrodes.

As another example, the headset 701 may have multiple input regions. FIG. 7D depicts an expanded view of the area 706 in FIG. 7A, showing an embodiment of the headset 701 that has multiple input regions 720, 722. First electrodes 724, 726 contact the quantum tunneling material of the first input region 720, and second electrodes 728, 730 contact the quantum tunneling material of the second input region 722. In order to prevent deformations of the first input region 720 from being detected by the second electrodes 728, 730, the second electrodes may be insulated at least through the first input region. In some cases, the second electrodes 728, 730 are insulated along all (or substantially all) of their length, except where the second electrodes contact the quantum tunneling material of the second input region.

While the input regions in FIG. 7D are defined by non-contiguous areas of conductive particles (e.g., the area between the input regions 720, 722 has no conductive particles), multiple input regions may be located within a contiguous area of conductive particles. For example, in some embodiments, the entire jacket 716 includes conductive particles, and electrodes are terminated in areas of the jacket 716 that are to act as input regions.

Input regions may be located anywhere on the headset. For example, input regions may be located on the main trunk 732 of the headset cord 702. Alternatively or additionally, input regions may be located on one or both of the speaker branches 734. Placing input regions on different speaker branches allows users to more easily differentiate between the different functions that each input region controls. For example, an input region on the right speaker branch may increase volume, while an input region on the left speaker branch may decrease volume. Where each speaker branch 734 has an input region, the input region may be the entire length of the speaker branch. Thus, a user does not have to find a particular location along the branch in order to provide an input—they can simply squeeze anywhere on the speaker branch and the smartphone 700 will detect an input. Moreover, the speakers 704 (or housings that enclose the speakers) often have different shapes to correspond to specific ears (e.g., right or left ears). Accordingly, a user can easily distinguish between the right and left speaker branches and thus distinguish between the functions of the input regions on the speaker branches.

While FIGS. 7A-7D depict a particular smartphone and headset, these are merely examples of the types of electronic devices and accessories that may use quantum tunneling materials (or other touch-sensitive materials) for an input accessory. For example, the foregoing discussion applies equally to other electronic devices, such as portable media players, wearable electronic device (e.g., smart watches), tablet computers, and the like. Further, quantum tunneling materials may be incorporated into other accessories to facilitate their use as input devices, including lanyards, power/charging cables, communication cables, and the like.

As noted above, quantum tunneling material may be used as the touch-sensitive material in the foregoing embodiments. The term "quantum tunneling" may refer to the quantum mechanical phenomenon in which a charge (e.g., a flow of electrons) passes through a medium that it generally could not pass through. For example, in an electrically insulating matrix material doped with conductive particles, when the average distance between conductive particles is sufficiently large, electrons generally will not pass through the matrix material that is between the conductive particles, and the resistance of the doped matrix material may be similar to that of undoped matrix material (e.g., it will have a relatively high resistance). However, when the matrix material is deformed (e.g., compressed or otherwise made smaller), the conductive particles are brought into closer proximity, and despite not being in direct contact (e.g., due to the presence of matrix material between the carbon particles), electrons may pass between the conductive particles, causing the electrical resistance of the doped matrix material to drop.

One example of a quantum tunneling material is a silicone matrix that is doped with dispersed carbon particles, though other matrix materials and dopants may be used as well. For example, a matrix material may be any appropriate deformable and/or elastomeric material, such as silicone (e.g., silicone rubber), polybutadiene, neoprene, styrene-butadiene rubber, fluorosilicone rubber, thermoplastic elastomers, and the like. Dopants may be particles of any appropriate conductive material, such as nickel, iron, steel, aluminum, carbon, copper, gold, silver, or the like.

Figure 8A:
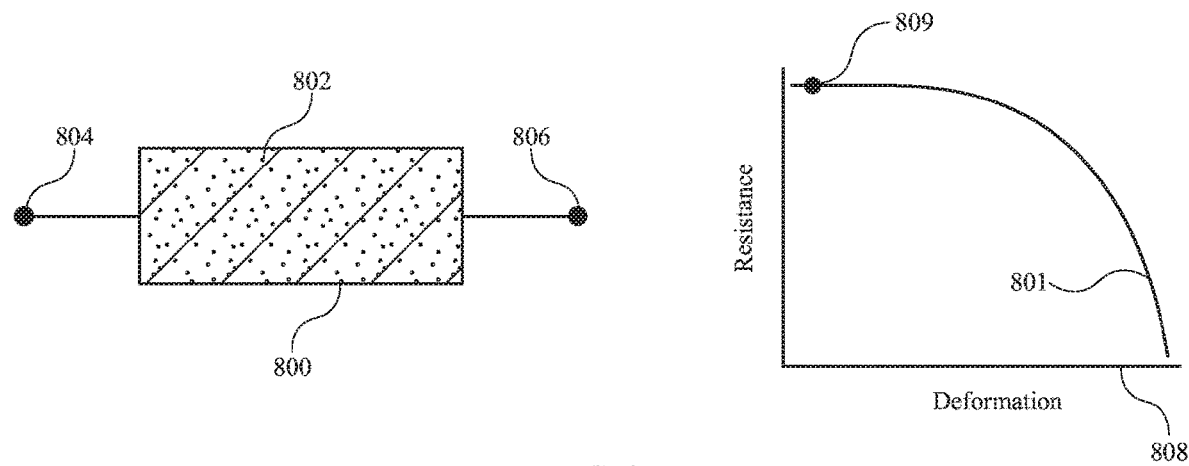
FIGS. 8A-8C show an exemplary relationship between deformation and resistance of a quantum tunneling material.
Figure 8B:
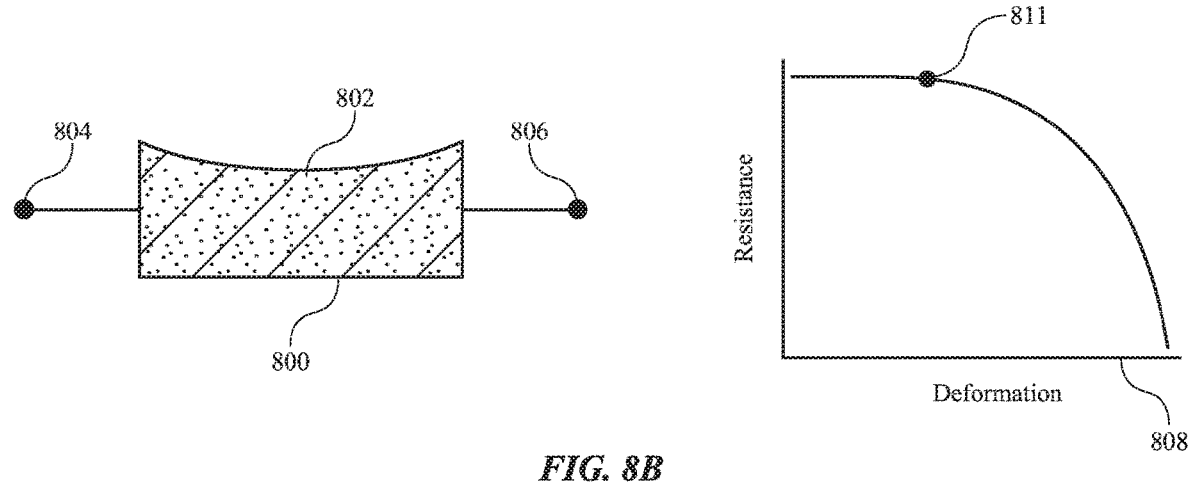
Figure 8C:
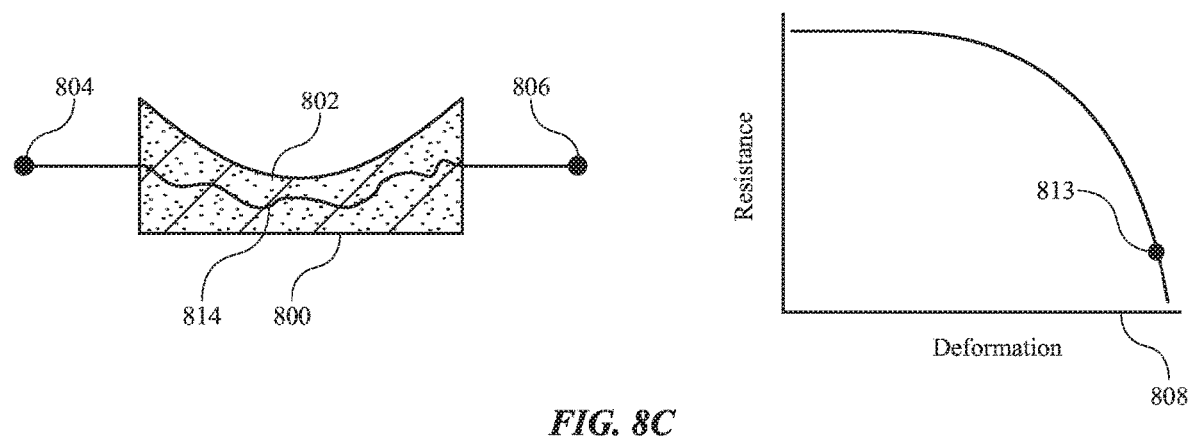

FIGS. 8A-8C depict how deformation of a quantum tunneling material affects the electrical resistance of the material. Chart 808 in FIG. 8A illustrates an example of the change in resistance versus the change in deformation of a quantum tunneling material. The curve 801 has a relatively linear portion corresponding to small (or no) changes to resistance in response to small deformations, followed by an abrupt downward trend corresponding to larger changes in resistance in response to further deformation. The downward trend of the curve 801 may be linear, exponential, logarithmic, or the like. Regardless of the particular shape or mathematical characterization of the curve, a device may be able to detect a point at which the resistance of the quantum tunneling material becomes sufficiently low (or the rate of change of the resistance satisfies a particular threshold) to signify a user input.

FIG. 8A illustrates a portion 800 of elastomeric material (e.g., silicone) doped with conductive particles 802 (e.g., carbon), when the portion is in an undeformed state (e.g., when a user is not pressing on an input region containing the portion 800). Chart 808 illustrates the change in resistance versus the change in deformation of the portion 800, measured across electrodes 804 and 806. In the undeformed state, the resistance of the portion 800 (point 809) is at or near a maximum resistance of the portion 800.

FIG. 8B depicts the portion 800 in a partially deformed state (e.g., when a user has begun to press on the input region). In the partially deformed state, the resistance of the portion 800 (point 811) is still at or near the maximum resistance of the portion 800. Thus, an electronic device would not yet register this amount of deformation as a user input. The fact that the partially deformed state may not result in a substantial decrease in resistance helps avoid false-positive inputs caused by bumps or impacts that are typical during normal use of an electronic device.

FIG. 8C depicts the portion 800 in a fully deformed state. In this state, the conductive particles 802 are close enough that, due to quantum tunneling effects, a conductive path 814 is formed between the electrodes 804 and 806, and the resistance of the portion 800 (point 813) has dropped substantially. Because of the substantial drop in resistance across the portion 800, an electronic device can easily detect whether or not an input region containing the portion 800 has been depressed.

The deformations and the resistance versus deformation charts in FIGS. 8A-8C are merely illustrative, and are not necessarily characteristic of any specific quantum tunneling material. Rather, they show how deformation of a quantum tunneling material may result in a drastic change in resistance of material—a change that can be detected by an electronic device in order to register a user input. Moreover, while the charts in FIGS. 8A-8C illustrate an abrupt change in resistance at a particular deformation (e.g., an exponential change), this is not necessarily the case for all quantum tunneling or touch-sensitive materials that may be used in the embodiments described herein. For example, in some cases, the resistance may change more gradually in response to deformation, such as linearly. In such cases, it may be possible to correlate a particular amount of deformation with a particular resistance, such that the quantum tunneling material can be used to determine and/or estimate an amount of force applied to the material.

Figure 9A:
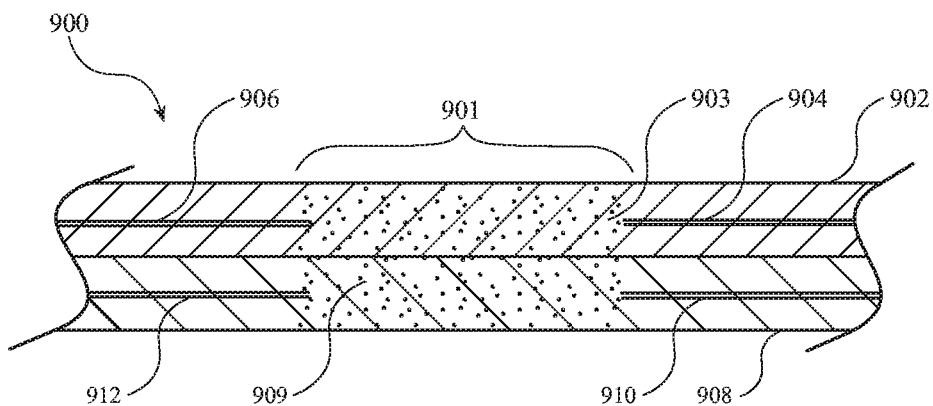
FIGS. 9A-9C show cross-sectional views of an example multi-stage input mechanism.
Figure 9B:
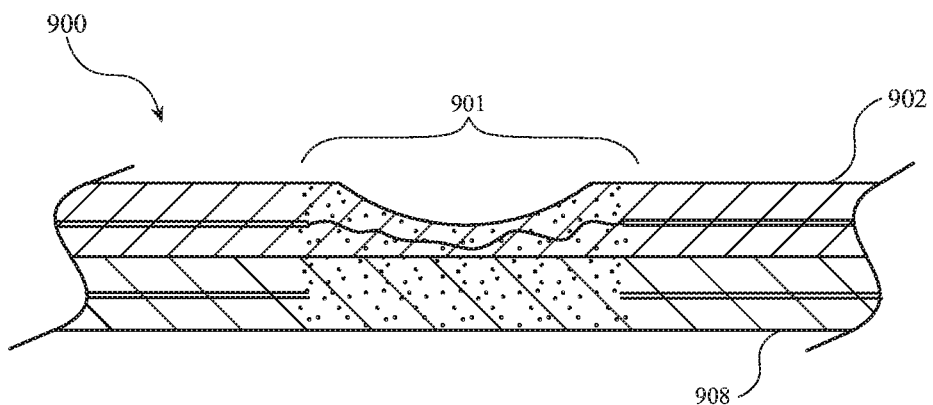
Figure 9C:
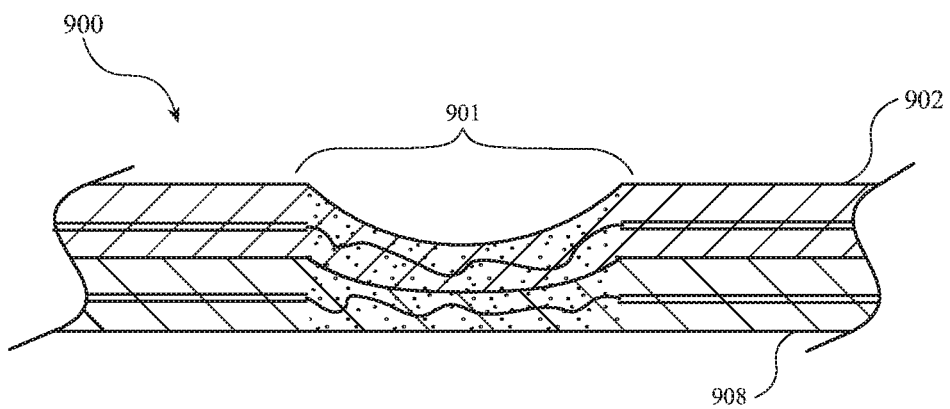

FIGS. 9A-9C illustrate how touch-sensitive materials may be stacked or laminated in order to form a multi-stage input mechanism that responds differently to different magnitudes of applied force. For example, FIGS. 9A-9C are partial cross-sections of a portion of a two-stage input mechanism 900, taken across line 9A-9A in FIG. 2A. (The input region 202 in FIG. 2A may or may not be a two-stage input mechanism; rather, line 9A-9A is provided to illustrate the location of the cross-sections in FIGS. 9A-9C, and not to limit the input region 202 to any particular type or arrangement of touch-sensitive materials.)

The input mechanism 900 includes a first layer 902 of elastomeric material, where a portion of the first layer corresponding to an input region 901 is doped with conductive particles 903, thus forming a quantum tunneling material. The first layer 902 also includes electrodes 904, 906 in contact with the doped portion of the first layer 902.

The input mechanism 900 also includes a second layer 908 of elastomeric material disposed below the first layer 902, where a portion of the second layer corresponding to the input region 901 is doped with conductive particles 909, thus forming a quantum tunneling material. The second layer 908 also includes electrodes 910, 912 in contact with the doped portion of the second layer 908. The electrodes allow a case or an electronic device to measure a value of an electrical resistance through the doped portions of the first and second layers. (As noted above, in some embodiments, the layers 902, 908 are doped with conductive particles in areas other than just the input region 901.)

The first and second layers may be separate sheets of material that are glued, melted, or otherwise coupled together to form the two-stage input mechanism. In some embodiments, the input mechanism 900 includes an insulating layer (not shown) disposed between the first and second layers. An insulating layer may isolate resistance measurements to a single layer, and avoid possible interference or erroneous measurements caused by the conductive particles of an adjacent layer.

The first layer and the second layer may respond differently to a particular input, such that a lower force will result in only one of the layers registering an input, and a higher force will result in the other (or both) layers registering an input. For example, a touch force corresponding to a user input may cause an electrical resistance of the first layer to change by a first amount, and an electrical resistance of the second layer to change by a second amount that is different from the first amount.

FIG. 9B depicts the input mechanism 900 while being subjected to a touch event having a force of a first magnitude. The first layer 902 has deformed in the input region 901, but the second layer 908 has not deformed. Accordingly, the value of the electrical resistance across the input region 901 of the first layer 902 has changed sufficiently to register an input on the first layer 902 (e.g., as detected by a sensing circuit and/or a processing unit of an electronic device), and the value of the electrical resistance across the input region 901 of the second layer 908 has not changed, or has not changed substantially enough, to register an input on the second layer 908. FIG. 9C depicts the input mechanism 900 while being subjected to a touch event of a force having a second magnitude that is greater than the first magnitude. Under this condition, the first layer 902 and the second layer 908 are deformed sufficiently to register inputs on both layers.

A multi-stage input mechanism, such as the input mechanism 900, may use layers having different hardnesses (e.g., durometers). The differing hardnesses may help ensure that different layers register an input at different force magnitudes (and/or different amounts of deformation of the input mechanism). For example, the first layer 902 may have a first hardness, and the second layer 908 may have a second hardness that is greater than the first. Thus, a touch event of a relatively light force may cause deformation of the softer first layer 902 only, causing a device (e.g., the device 100) to detect an input on the first layer only. A touch event of a relatively higher force, however, causes the second, harder layer to deform, causing the device to detect an input on the second layer as well as the first layer. The device may take different actions depending on whether inputs are detected on the first layer 902, or both layers.

In addition to ensuring that different layers respond differently to application of a given force, a difference in hardness between the layers also provides a multi-stage tactile feedback to the user. For example, because the softer layer deflects more easily than the harder layer, when a user presses on the multi-stage input mechanism, the user will feel the deformation of the softer layer until a first force or deformation is reached. At that time, the harder layer will resist the user's input, indicating that the user has reached the first input stage. If the user increases the force with which they are pressing, the harder layer will begin to deform according to a different force response than the softer layer. The difference in force required to deform the first and second layers is detectable by a user, allowing the user to easily control the type of input being provided.

While the foregoing example describes using materials of different hardness, this is merely one material property that may be varied between layers to produce the desired multi-stage tactile feedback. For example, layers having differing stiffness, strength, toughness, viscosity, or any other appropriate material property or properties may result in a multi-stage tactile feedback response.

A multi-stage input mechanism may also be formed from layers that have the same or similar hardness. For example, the first layer 902 and the second layer 908 may be formed from the exact same material. In such cases, the first layer 902 may absorb the initial force of a touch event on the input region 901, resulting in deformation of the first layer 902 while diffusing the force such that the second layer 908 does not deform enough to register an input. A higher force must then be applied to result in sufficient deformation of the second layer 908 to result in detection of an input on that layer.

Figure 10:
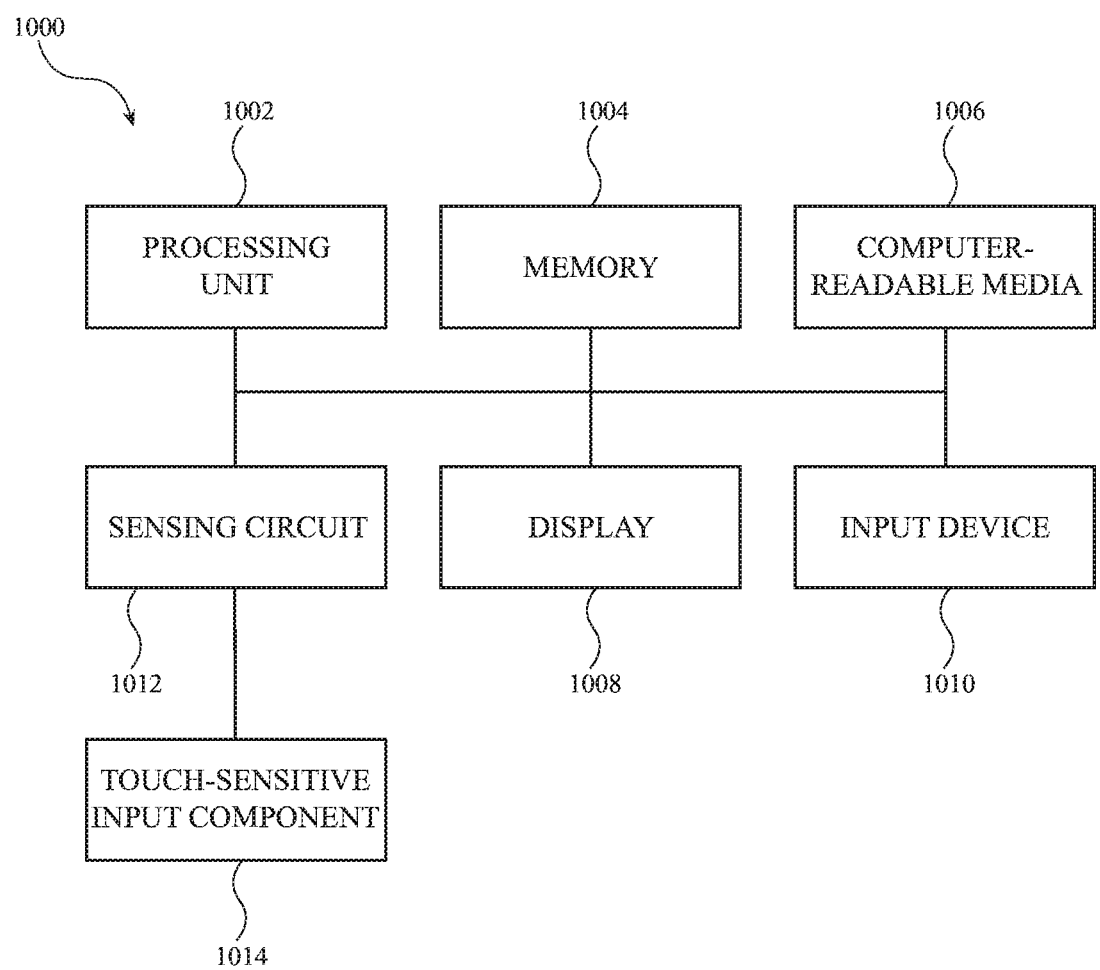
FIG. 10 shows an example electronic device having touch-sensitive materials.

FIG. 10 depicts an example electronic device 1000 having a touch-sensitive material. The schematic representation depicted in FIG. 10 may correspond to components of the electronic devices described above, including the device 100 depicted in FIGS. 1A-1B, the case 102 depicted in FIGS. 1A-2C, the watch 500 depicted in FIGS. 5-6B, or the device 700 depicted in FIG. 7. However, FIG. 10 may also more generally represent other types of devices that are configured to use a touch-sensitive material.

As shown in FIG. 10, a device 1000 includes a processing unit 1002 operatively connected to computer memory 1004 and computer-readable media 1006. The processing unit 1002 may be operatively connected to the memory 1004 and computer-readable media 1006 components via an electronic bus or bridge. The processing unit 1002 may include one or more computer processors or microcontrollers that are configured to perform operations in response to computer-readable instructions. The processing unit 1002 may include the central processing unit (CPU) of the device. Additionally or alternatively, the processing unit 1002 may include other processors within the device including application specific integrated circuit (ASIC) and other microcontroller devices.

The memory 1004 may include a variety of types of non-transitory computer-readable storage media, including, for example, read access memory (RAM), read-only memory (ROM), erasable programmable memory (e.g., EPROM and EEPROM), or flash memory. The memory 1004 is configured to store computer-readable instructions, sensor values, and other persistent software elements. Computer-readable media 1006 also includes a variety of types of non-transitory computer-readable storage media including, for example, a hard-drive storage device, solid state storage device, portable magnetic storage device, or other similar device. The computer-readable media 1006 may also be configured to store computer-readable instructions, sensor values, and other persistent software elements.

In this example, the processing unit 1002 is operable to read computer-readable instructions stored on the memory 1004 and/or computer-readable media 1006. The computer-readable instructions may adapt the processing unit 1002 to perform the operations of detecting a touch input on a touch-sensitive material, and taking an appropriate action in response to the detection (e.g., controlling an operation, application, or other function of the device 1000). The computer-readable instructions may be provided as a computer-program product, software application, or the like.

As shown in FIG. 10, the device 1000 also includes a sensing circuit 1012 operatively coupled to a touch-sensitive input component 1014. The sensing circuit 1012 may be coupled to the touch-sensitive input component 1014 via electrodes, such as electrodes 206, 208, 210, and 212 depicted in FIG. 2A. The sensing circuit 1012 senses, measures, and/or calculates an electrical characteristic of the touch-sensitive input component 1014, such as electrical resistance, capacitance, or any other appropriate electrical characteristic. The sensing circuit 1012 may provide instantaneous values of an electrical characteristic, and/or it may provide any appropriate derived value, such as the rate of change of the electrical characteristic. The sensing circuit 1012 may communicate values to the processing unit 1002, and the processing unit 1002 may then determine whether the received values correspond to a user input. Alternatively or additionally, the sensing circuit 1012 may determine whether the sensed, measured, and/or calculated values correspond to a user input, and then provide an indication to the processing unit 1002 that a user input has been detected.

As shown in FIG. 10, the device 1000 optionally includes a display 1008 and an input device 1010. The display 1008 may include a liquid-crystal display (LCD), organic light emitting diode (OLED) display, light emitting diode (LED) display, or the like. If the display 1008 is an LCD, the display may also include a backlight component that can be controlled to provide variable levels of display brightness. If the display 1008 is an OLED or LED type display, the brightness of the display may be controlled by controlling the electrical signal that is provided to display elements.

The input device 1010 is configured to provide user input to the device 1000. The input device 1010 may include, for example, a touch screen, touch button, keyboard, key pad, or other touch input device. The device 1000 may include other input devices, including, for example, power buttons, volume buttons, home buttons, scroll wheels, and camera buttons.

Where the device 1000 corresponds to a smartphone (e.g., device 100) or a watch (e.g., watch 500), the device may include the display 1008 and the input device 1010. Where the device corresponds to a case (e.g., the case 102 or 400), the display 1008 and the input device 1010 may be omitted.

Figure 11:
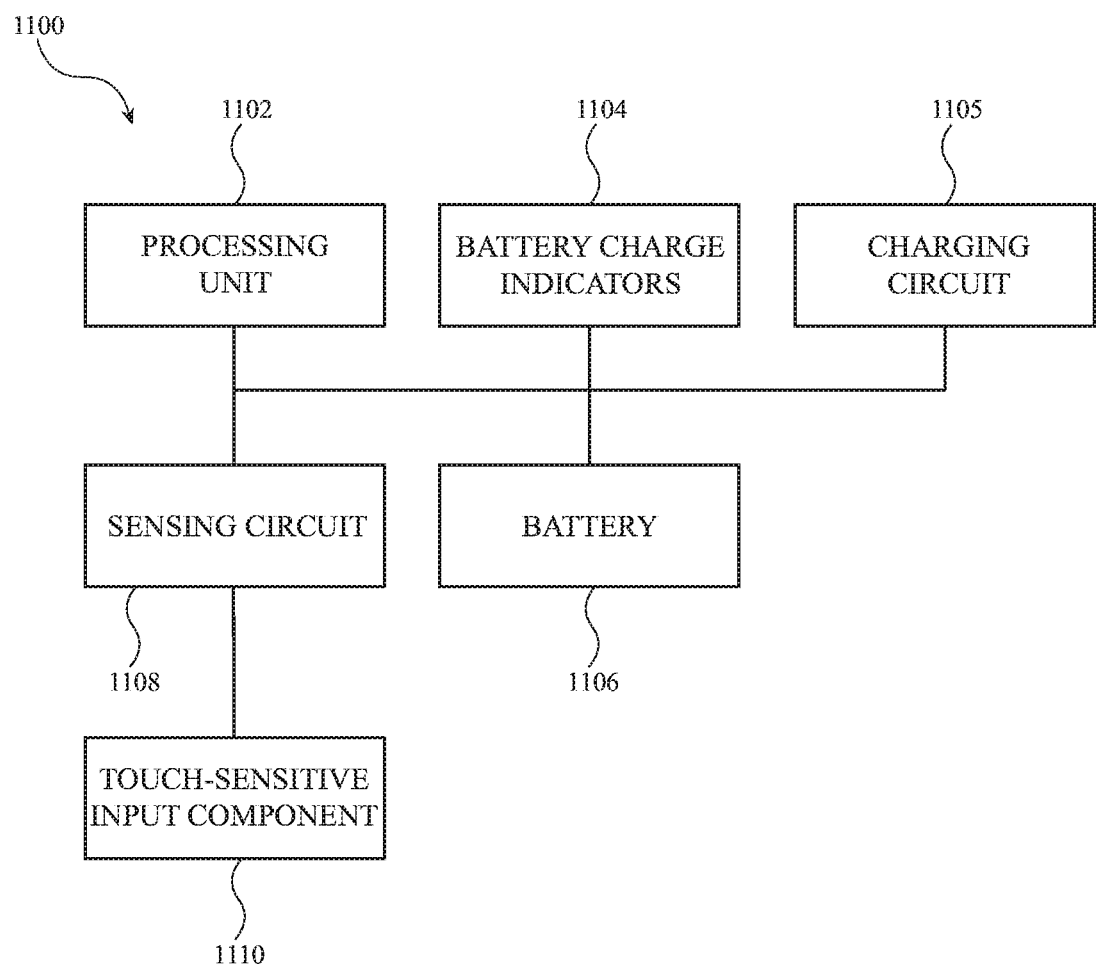
FIG. 11 shows an example case for an electronic device having touch-sensitive materials.

FIG. 11 depicts an example case having a touch-sensitive input material. The schematic representation depicted in FIG. 11 may correspond to components of the cases described above, including the case 302 depicted in FIG. 3. However, FIG. 11 may also more generally represent other types of devices and/or cases that are configured to use a touch-sensitive material.

As shown in FIG. 11, a case 1100 includes an optional processing unit 1102, a battery 1106, a charging circuit 1105, battery charge indicators 1104, and a sensing circuit 1108, all operatively coupled via an electronic bus or bridge. The processing unit 1102 may include one or more computer processors or microcontrollers that are configured to perform operations in response to computer-readable instructions. The processing unit 1102 may include a central processing unit (CPU). Additionally or alternatively, the processing unit 1102 may include other processors within the device including application specific integrated circuit (ASIC) and other microcontroller devices.

The battery 1106, which may correspond to the battery 304 depicted in FIG. 3) may be a supplemental battery disposed within a case and configured to provide power to an electronic device housed within the case. The battery 1106 may be operatively coupled to the charging circuit 1105, which may monitor the charge state of the battery 1106 (and/or other parameters or aspects of the battery 1106) and control the charging of the battery 1106 (e.g., by regulating the electrical power delivered to the battery 1106 for charging).

The sensing circuit 1108 is operatively coupled to a touch-sensitive input component 1110 (e.g., the input region 303 depicted in FIG. 3). The sensing circuit 1108 may be coupled to the touch-sensitive input component 1110 via electrodes, such as those depicted in FIG. 2A. The sensing circuit 1108 senses, measures, and/or calculates an electrical characteristic of the touch-sensitive input component 1110, such as electrical resistance, capacitance, or any other appropriate electrical characteristic, and communicates information about the electrical characteristic to the processing unit 1102. The processing unit 1102 and/or the sensing unit 1108 may determine whether the sensed, measured, and/or calculated values correspond to a user input.

The battery charge indicators 1104 (e.g., the battery charge indicators 306 depicted in FIG. 3) may include or be coupled to light emitting components, such as light emitting diodes. When a user input is detected by the sensing circuit 1108 and/or the processing unit 1102, the processing unit 1102 may cause the battery charge indicators 1104 to indicate an amount of charge remaining by illuminating in proportion to the charge level of the battery 1106. For example, if the battery 1106 is fully charged, all of the battery charge indicators 1104 may illuminate; if the battery 1106 is nearly empty, only one of the indicators 1104 may illuminate.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A watch band for coupling a watch to a user, the watch band comprising:
an end portion configured to attach to a housing of the watch; and
an input region comprising:
a first layer comprising a first deformable material; and
a second layer comprising a second deformable material;
wherein:
when a first touch force is applied to the input region, the first layer is configured to decrease in electrical resistance enough to register a first user input and the second layer is configured not to decrease in electrical resistance enough to register the first user input; and
when a second touch force is applied to the input region with a magnitude greater than a magnitude of the first touch force, the first layer and the second layer are each configured to decrease in electrical resistance enough to register a second user input.

2. The watch band of claim 1, further comprising:
first electrodes coupled to the first layer; and
second electrodes coupled to the second layer;
wherein the first electrodes and the second electrodes are configured to operatively couple the input region to the housing of the watch.

3. The watch band of claim 1, wherein:
the first layer has a first hardness; and
the second layer has a second hardness different from the first hardness.

4. The watch band of claim 1, further comprising a first electrical contact at the end portion and being configured to operatively couple the input region to a sensing circuit of the watch via a second electrical contact of the housing of the watch.

5. The watch band of claim 1, wherein the watch is configured to perform a first action upon detection of the first user input and a second action upon detection of the second user input.

6. The watch band of claim 1, wherein the first or second deformable material forms an exterior surface of the watch band.

7. A watch band for coupling a watch to a user, the watch band comprising:
a lug configured to attach to a housing of the watch;
a user input region having an area and comprising:
a first layer comprising a first touch-sensitive material; and
a second layer comprising a second touch-sensitive material disposed below the first layer;
first electrodes in contact with the first touch-sensitive material and configured to be operatively coupled to a sensing circuit of the watch; and
second electrodes in contact with the second touch-sensitive material and configured to be operatively coupled to the sensing circuit;
wherein:
in response to application of a force to the first layer, an electrical resistance of the first layer changes differently than an electrical resistance of the second layer;
the sensing circuit is configured to detect a change to the electrical resistance of the first layer and a change to the electrical resistance of the second layer; and
the user input region is at least partially surrounded by another area greater than the area of the user input region, the other area being formed from the first or second touch-sensitive material.

8. The watch band of claim 7, wherein the first touch-sensitive material and the second touch-sensitive material are formed from an elastomeric material having a conductive material embedded therein.

9. The watch band of claim 8, wherein the elastomeric material is silicone and the conductive material is carbon.

10. The watch band of claim 7, wherein the first electrodes and the second electrodes are configured to operatively couple the user input region to the housing of the watch.

11. The watch band of claim 7, wherein:
the first layer has a first hardness; and
the second layer has a second hardness different from the first hardness.

12. The watch band of claim 7, further comprising:
first electrical contacts at the lug, the first electrical contacts being operatively coupled to the first electrodes to communicate with the sensing circuit; and
second electrical contacts at the lug, the second electrical contacts being operatively coupled to the second electrodes to communicate with the sensing circuit.

13. The watch band of claim 7, wherein the user input region is configured to provide an indication that the user input region has deformed to allow the watch band to be coupled to a wrist of the user.

14. The watch band of claim 7, wherein the watch is configured to perform an action upon detection that the force is applied to the first layer.

15. A watch band for coupling a watch to a user, the watch band comprising:
a lug configured to attach to a housing of the watch;
a user input region comprising:
a first layer of a first deformable, conductive material having a first hardness; and
a second layer of a second deformable, conductive material positioned below the first layer and having a second hardness that is different from the first hardness, wherein a touch force on the user input region causes an electrical resistance of the first layer and an electrical resistance of the second layer to change by different amounts; and
first electrodes in contact with the first deformable, conductive material and configured to be operatively coupled to a sensing circuit of the watch; and
second electrodes in contact with the second deformable, conductive material and configured to be operatively coupled to the sensing circuit, the sensing circuit being configured to detect a change to the electrical resistance of the first layer and a change to the electrical resistance of the second layer.

16. The watch band of claim 15, wherein:
the first and second deformable, conductive materials each comprises an elastomeric material having a conductive material embedded therein; and
a portion of the watch band adjacent the first or second deformable, conductive material comprises the elastomeric material substantially free of the conductive material.

17. The watch band of claim 15, wherein:
the user input region is a first user input region; and
the watch band further comprises a second user input region formed from the first or second deformable, conductive material.

18. The watch band of claim 15, wherein the first or second deformable, conductive material forms an exterior surface of the watch band.

19. The watch band of claim 15, wherein the user input region is configured to provide an indication that the user input region has deformed to allow the watch band to be coupled to a wrist of the user.

20. The watch band of claim 15, further comprising a grid of user input regions, the grid comprising:
a first set of elongate user input regions formed from the first deformable, conductive material, each of the first set of elongate user input regions extending along a first direction; and
a second set of elongate user input regions formed from the second deformable, conductive material, each of the second set of elongate user input regions extending along a second direction that is transverse to the first direction, wherein the grid of user input regions includes the user input region.

\* \* \* \* \*